US007310776B2

(12) United States Patent
Mansell et al.

(10) Patent No.: US 7,310,776 B2
(45) Date of Patent: Dec. 18, 2007

(54) CONTROL SYSTEM WITH CUSTOMIZABLE MENU STRUCTURE FOR PERSONAL MOBILITY VEHICLE

(75) Inventors: Wayne T. Mansell, Stourbridge (GB); Mark E. Greig, Longmont, CO (US); Peter J. Tasker, Bridgnorth (GB)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 11/648,917

(22) Filed: Jan. 2, 2007

(65) Prior Publication Data

US 2007/0130522 A1   Jun. 7, 2007

Related U.S. Application Data

(63) Continuation-in-part of application No. 10/676,522, filed on Oct. 1, 2003, now Pat. No. 7,169,181.

(51) Int. Cl.
*G06F 3/00* (2006.01)
*G06F 3/14* (2006.01)

(52) U.S. Cl. .............. 715/744; 715/747; 715/810; 715/841; 715/865; 701/1; 280/250.1

(58) Field of Classification Search ........ 715/700, 715/769, 744–747, 762–765, 810, 811, 835, 715/846, 847, 865, 961, 965, 970; 345/905; 701/1, 22, 38; 180/409, 907; 280/29, 250.1; 700/17, 83
See application file for complete search history.

(56) References Cited

U.S. PATENT DOCUMENTS 5,016,003 A    5/1991  Rice
5,287,514 A    2/1994  Gram
5,961,561 A   10/1999  Wakefield
6,005,577 A   12/1999  Breitlow
6,069,623 A    5/2000  Brooks
6,724,402 B1*  4/2004  Baquero ............... 715/765
2005/0195173 A1*  9/2005  McKay .................. 345/173
2005/0203684 A1*  9/2005  Borgesson .............. 701/36
2005/0246651 A1* 11/2005  Krzanowski ........... 715/770
2005/0264472 A1* 12/2005  Rast ....................... 345/30
2005/0268247 A1* 12/2005  Baneth ................... 715/781
2006/0282790 A1* 12/2006  Matthews et al. ...... 715/767
2007/0056782 A1*  3/2007  Chopcinski et al. ... 180/65.1
2007/0130544 A1*  6/2007  Kim et al. .............. 715/828
2007/0130605 A1*  6/2007  Chung .................... 725/131

FOREIGN PATENT DOCUMENTS

GB    2381431    4/2003

OTHER PUBLICATIONS

M. W. Nelisse, "Applying Windows CE to M3S—A Real Windows CE Control Appl." Oct. 5, 1988.
Anonymous, "Toolbars and Status Bar" May 31, 2000.

* cited by examiner

*Primary Examiner*—X. L. Bautista
(74) *Attorney, Agent, or Firm*—MacMillan, Sobanski & Todd, LLC

(57) ABSTRACT

A control system for a personal mobility vehicle has a menu structure that can be ordered so that commonly used areas of the menu are grouped together, thus avoiding the need to frequently navigate through seldom-used portions of a standard menu structure.

29 Claims, 25 Drawing Sheets

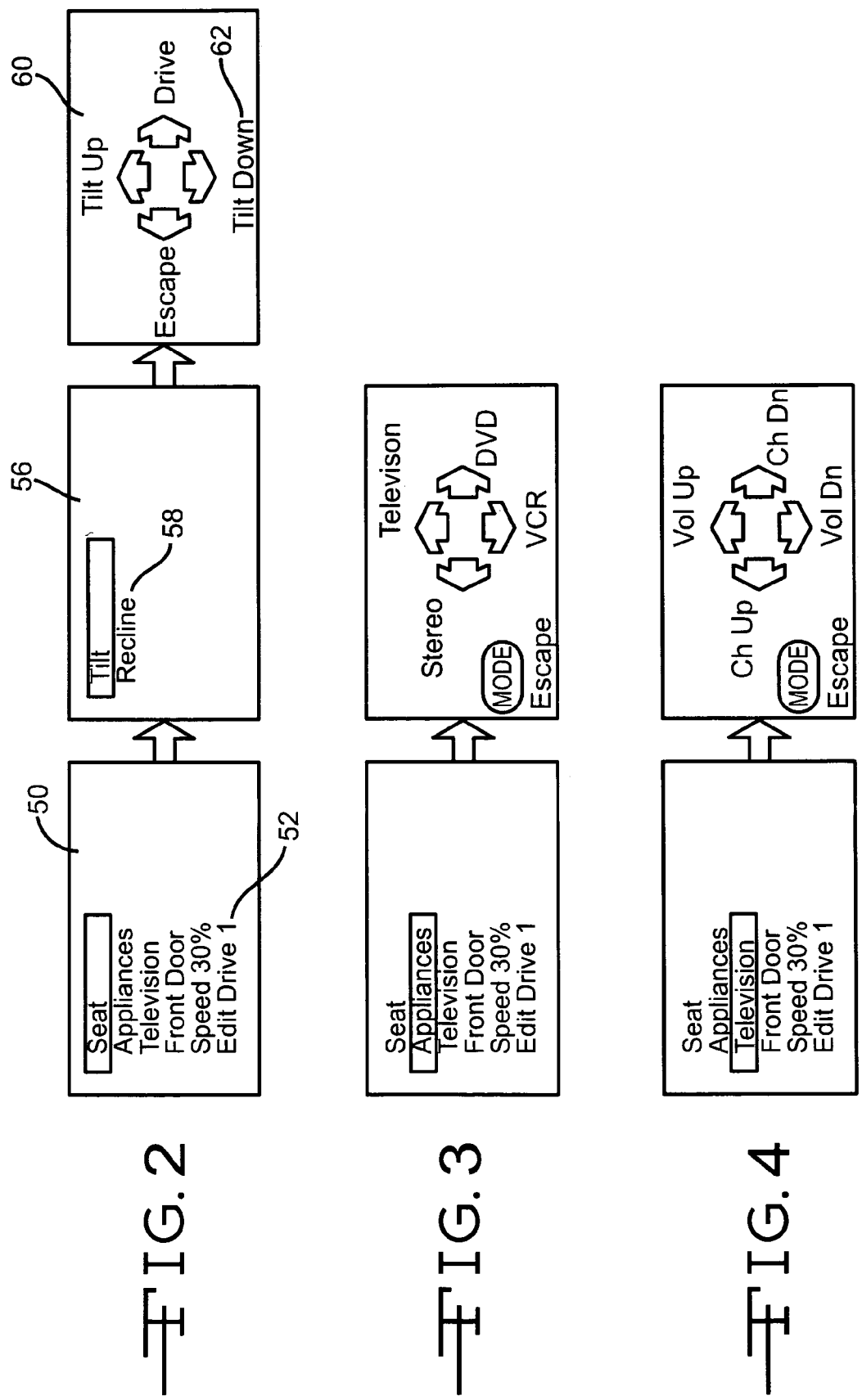

FIG. 5

Seat
Appliances
Television
| Front Door |
Speed 30%
Edit Drive 1

FIG. 6

Seat
Appliances
Television
Front Door
| Speed 30% |
Edit Drive 1

CONTROL SYSTEM WITH CUSTOMIZABLE MENU STRUCTURE FOR PERSONAL MOBILITY VEHICLE

CROSS REFERENCE TO RELATED APPLICATIONS

This application is a continuation of application Ser. No. 10/676,522, filed Oct. 1, 2003, issued as U.S. Pat. No. 7,169,181, on Jan. 2, 2007, the description of which is incorporated herein in its entirety.

BACKGROUND OF INVENTION

This invention relates in general to land vehicles and, more particularly, to control systems and personal mobility vehicles therewith.

Electronic control systems for personal mobility vehicles, such as power wheelchairs, scooters, and the like, are well known. Such systems control the motion and behavioral functions of the vehicle in response to command signals from a user (e.g., a wheelchair occupant or attendant). Generally, such systems control the function of drive wheels, which support the vehicle for movement on a supporting surface. In addition, various other functions are controlled by the control system, including the vehicle seat functions, horn and light functions, and accessory functions.

Conventional electronic control systems typically require users to execute a very large number of sequential input commands by navigating through a menu structure. Many wheelchair occupants are not able to execute complicated sequential input commands. Ease of use of the electronic control system, especially reducing the number of menu navigation command sequences required for activities of daily living, is a major issue in designing and applying an electronic control system to a wheelchair. Currently available electronic control systems generally do not facilitate ease of use because menu navigation is only possible by moving through a fixed menu structure.

SUMMARY OF INVENTION

The present invention is directed toward a control system that has the ability to order its menu structure to group commonly used areas of the structure together, thus avoiding the need to frequently navigate through seldom-used portions of a standard menu structure.

The invention is also directed toward a display for an electronic control system for a personal mobility vehicle, wherein the display has a customized menu structure having one or more menu selection items that are unique to a particular user of the vehicle.

The invention is also directed toward a programmable menu structure for a personal mobility vehicle, wherein the menu has a structure with an ability to be rearranged according to preferences of a user.

The invention is also directed toward a display for an electronic control system for a personal mobility vehicle, wherein the display has one or more menu selection items that are labeled with customizable text, icons, or a combination thereof.

The invention is further directed toward a menu having an auto-scan feature.

BRIEF DESCRIPTION OF DRAWINGS

FIGS. 2-6 are diagrammatic representations of customizable electronic control system menu structures and sample functions which may be associated with various menu selection items.

DETAILED DESCRIPTION

Figure 1:
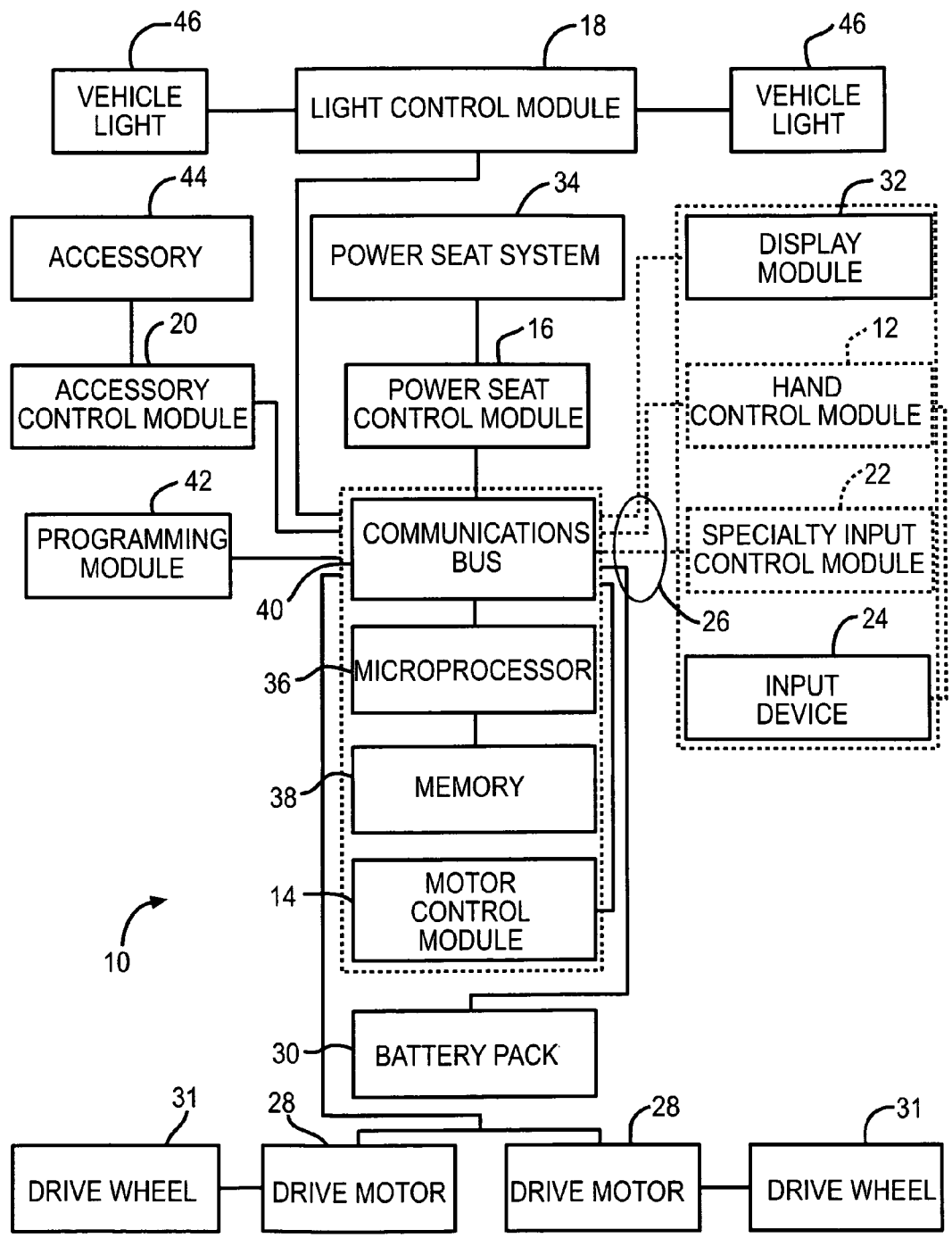
FIG. 1 is a diagrammatic representation of an exemplary electronic control system.
Figure 7:
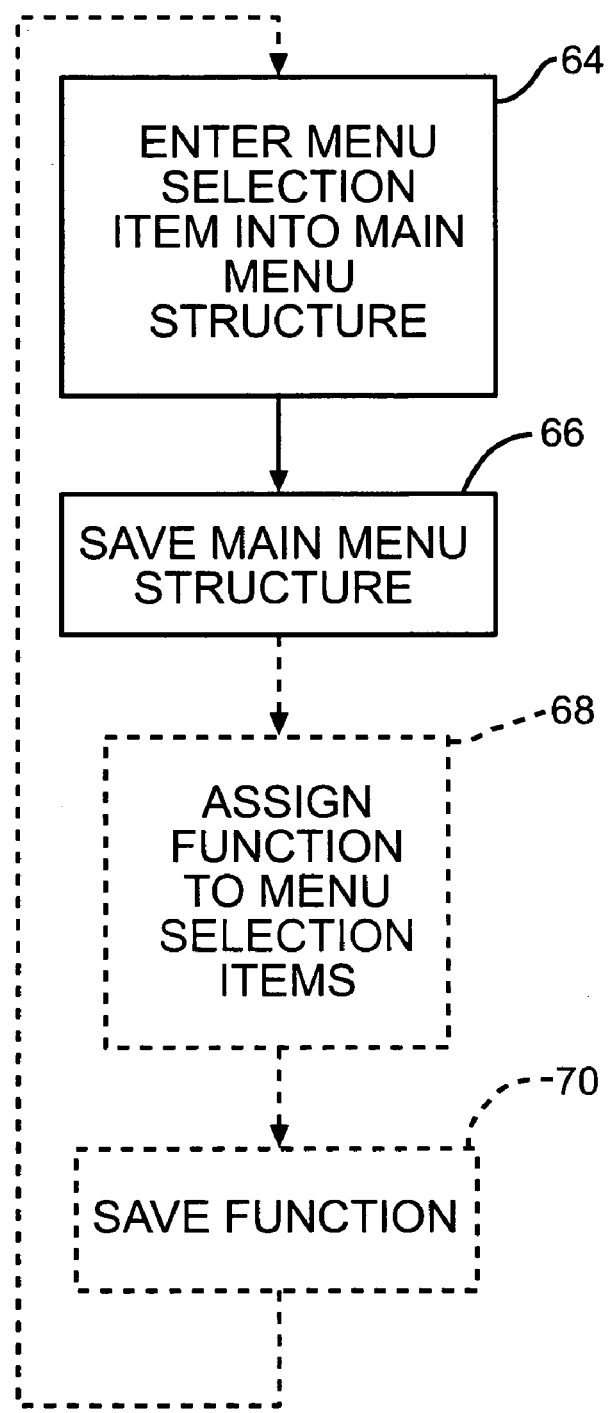
FIG. 7 is a flow diagram of a method for customizing the electronic control system menu.

Referring now to the drawings, there is illustrated in FIG. 1 a diagrammatic representation of an electronic control system 10 for a personal mobility vehicle, such as a power wheelchair, a scooter, or the like. The control system 10 controls various controllers or control modules, such as a hand control module 12, a motor control module 14, a power seat control module 16, a light control module 18, an accessory control module 20, which can otherwise be referred to as an environmental control module, a specialty input control module 22, and a specialty input device 24, such as a pneumatic input device and a grouping of switches designed for access by users with limited body control. The modules may be connected together by electrical cables 26 that carry command signals from module to module within the control system 10 and/or carry electronic power to various components of the vehicle.

The control system 10 is structured to be custom-configured, for example, by a user, a dealer, clinician or healthcare professional, or a manufacturer (OEM), for a specific user to match the user's physical and cognitive skills. The control system 10 may not have all the aforementioned modules but may have only those modules needed by that specific user. For example, if the user is a spinal chord injury paraplegic with normal arm and hand function and normal cognitive skills, the control system 10 might include only a hand control module 12, which may include a joystick and various switches, and a motor control module 14 to accept input signals from the hand control module 12, accept power from a battery pack 30, and output power to drive motors 28. These two modules 12, 14 may be connected by electrical cables 26 that carry command signals from the hand control module 12 to the motor control module 14 and carry electronic power to the various components of the vehicle. The hand control module 12 could be physically positioned on the vehicle armrest, near the user's hand, and the motor control module 14 could be positioned underneath the seat and near the battery pack 30 and the motors 28 that drive the wheels 31.

As another example, a less physically capable user, such as a high level quadriplegic spinal chord injury user with no arm and hand function and only limited ability to move the head, but with normal cognitive skills and ability to suck and blow lightly into a plastic tube, might have a specialty input control module 22, a display module 32, a motor control module 14, and a power seat control module 16. The specialty input control module 22 may include a variety of input ports to accept signals from input devices, such as, for example, switches, proportional devices, and/or pneumatic input devices. A pneumatic input device may convert a sequence of slight changes in air pressure (commonly called "sips" and "puffs") created by the user on a plastic tube into commands to control the movement of the vehicle, including the movement of the power seat system 34. The power-seat control module 16 is used to control the position of the user's seat system 34, for example, by changing the seat height, the angle of the backrest, the seat tilt angle, and the position of the leg rests. The display module 32 may give the user visual feedback regarding the state of the control system 10, the state of charge of the battery pack 30, the position of the power seat system 34, and/or other information of interest to the user.

The electronic control system 10 may include a programmable digital microprocessor 36 and a memory 38 with imbedded software to programmably control the operation of the vehicle. The software is preferably in a machine code or machine language and altering, tampering, interference or corruption of the software is preferably prevented. Various modules of the system 10 may communicate with each other over a digital communications bus 40. The system communications bus 40 may also provide power to the various modules.

When the vehicle is initially set up for a given user, a programming module 42, preferably in the form of a dongle, such as, for example, a CAN/USB gateway, may be connected to the system 10 to allow the control system 10 to be configured appropriately for that user, or to monitor the system 10 in use. Programming may include telling the system 10 what modules are connected (unless the system 10 is able to automatically detect the modules) and setting various parameters, such as the maximum speed or acceleration rate that would be appropriate for the specific user.

Exemplary devices and modules may be summarized as set forth in the following paragraphs.

Input devices may be in the form of switched inputs or analog inputs. Input devices may be connected to input modules, which translate the signals from the input device to the control system digital communications bus 40. Switched inputs are on/off switches physically arranged in design to allow access by a user with limited body function. Arrangements of one or more switches can be used to control movements of the vehicle and accessory functions, and can be placed on trays, on headrests, or other places reachable by the user. Switch closures by the user are interpreted into control commands by the system 10 based on the programming of the software and the operation of the input module. For example, a switch closure may start the vehicle moving forward at a preprogrammed speed, a second closure of another switch may then stop the vehicle movement. Analog inputs are proportional devices that are specially designed to allow access by the user. An example of an analog input device is a joystick. When the user displaces the joystick in a certain direction, the vehicle will move in that direction. The more the joystick is displaced, the faster the vehicle will move. Another example of an analog input is a proportional device, such as a head switch, which controls the speed of the vehicle based on the degree to which the switch is depressed by the user's head. A single module, such as a hand control module 12, can contain both an analog input, such as a joystick, and switched inputs within the same module 12.

Input modules may be used to accept signals from input devices, such as the input device 24, and send corresponding commands to the system communications bus 40. An input module may have built-in input devices. For example, a hand control module 12 may have a built-in joystick and built-in switches. Some input devices or modules may have built-in text and/or iconic displays (e.g., a liquid crystal display, commonly called an LCD, LEDs, or similar lights) for visual feedback to the user.

Visual feedback or display modules 32 may provide visual feedback to the user about the control system 10. The display module 32 may be a stand-alone module that generally has text or iconic display (e.g., an LCD). This text or iconic display may, for example, show the user what input device is active and the control mode in which the control system 10 is operating, or may allow the user to see what parameters are currently governing the control system 10, or may display battery state-of-charge information.

Motor control modules 14 may be provided for controlling the drive wheels 31 through the drive motors 28 and may act as a hub for the system 10 as a whole and may be housed in a separate enclosure with input and output connectors. Electronic cables 26 may be provided for connecting the motor control module 14 to the battery pack 30, the drive motors 28, the digital communications bus 40, and possibly other devices in the system 10, such as, speed encoders on the motors 28. The motor control module 14 may interpret system commands from input devices into output commands to the drive motors 28, the power seat control module 16, the light control module 18, the environmental control modules 20, and other components of the system 10.

The power seat control module 16 may be used to control the power seat system 34, if present, so that the position of the user may be adjusted. The power seat system 34 may use electric actuators to control the seat height, the angle of the backrest, the seat tilt angle, and the position of the leg rests, if the vehicle is equipped with these capabilities, or other capabilities if so equipped. The power seat control module 16 may translate user input signals into commands to the power seat system 34.

The light control module 18 may control lights 46 (e.g., headlights, turn indicators, and hazard lights) on the vehicle, if such lights are present. Input signals from the user may be translated into light control commands by the light control module 18.

An environmental control module 20 may be used to allow the user to control devices or accessories 44 external to the vehicle, such as, for example, computers, doors, or lights, via the input device of the control system 10. The environmental control module 20 may translate user inputs to control commands to operate an external device or accessory.

The programming module 42 may be provided to custom-configure the control system for a specific vehicle user to meet the user's individual needs or capabilities. Many control system parameters may be set using the programming module 42, such as the maximum speed and acceleration rate.

The electronic control system 10 also has a customizable menu structure, as illustrated, for example, in FIG. 2, which can be viewed on the display module 32 and navigated through via a hand control module 12, which may include a joystick and various switches, or a special input control device 24, such as a proportional device and various switches. The customizable menu structure has an ability to be rearranged or otherwise customized according to preferences of the user. For example, the customizable menu structure may be customizable so that commonly used portions of a standard (i.e., a non-customized or default factory installed) menu structure can be grouped together, avoiding the need to frequently navigate through seldom-used portions of the menu structure. In other words, the customizable menu structure may have one or more menu selection items that are uniquely arranged to meet the needs of a particular user.

In an exemplary embodiment, the menu structure includes a main user menu, generally indicated at 50. The menu structure includes various menu selection items 52 that, for example, may be most often accessed by a particular user. The menu selection items 52 shown facilitate the operation of the power seat system 34 and various accessories and controls, and operating parameters (e.g., speed) of the vehicle. Navigation through the menu 50 may be achieved though any suitable input, such as a hand control module 12 or a specialty input control module 24. For example, a menu selection-item, such as the menu selection item labeled "Seat", can be selected by first scrolling up and down the items 52, for example, by moving a joystick, or other input device, forward or backward until the desired menu selection item is reached and then by moving the joystick to the right. This may open a sub-menu, as shown at 56 in FIG. 2, which may contain more menu selection items 58, such as the menu selection items labeled "Tilt" and "Recline". Selecting one of these menu selection items 58 may open an action menu, as indicated at 60, which may contain menu selection items 62 that are associated with seat functions, such as the menu selection items labeled "Tilt Up" or "Tilt Down". By moving a joystick, or other input device, to the left, the user can back out or return to the main menu.

Functions of other menu selection items 52 in the main menu 50 are depicted, for example, in FIGS. 3-7. Selecting the menu selection item labeled "Appliance" in FIG. 3 may open an action menu (i.e., to the right when viewing FIG. 3). Selecting one of the menu selection items (i.e., action menu selection items) in the action menu may send a pulse to an assigned channel and pin of the environmental control module 20. The pin could be connected to an infrared device for controlling an external device or accessory (e.g., a television, a DVD, VCR, or a stereo). In this case, the user does not need to associate the channel and pin of the environmental control module 20 with the external device or accessory. Logical menu labels (e.g., a television, a DVD, VCR, or a stereo) may be presented to assist the user in identifying the external device or accessory associated with the menu selection items. In other words, the menu labels may have content that is associated with a particular action to be performed by selecting the menu selection item. The customized menu labels may be easily identified according to preferences of the user. For example, selecting the menu selection item labeled "Television" in FIG. 4 may open an action menu having action selection items for controlling the operation (e.g., the volume and the channel selection) of an external device or accessory, such as a television. The menu shown carries indicia indicating that the user can escape to the next higher level (e.g., the main menu) in the menu structure by pressing a mode switch on a hand control module. Selecting the menu selection item labeled "Front Door" in FIG. 5 may toggle an output of the electronic control module 20 associated with a front door opener. This may control the operation (e.g., opening and closing) of a front door. Selecting the menu selection item "Speed 30%" in FIG. 6 may permit a speed parameter of the vehicle to be set.

As is clearly illustrated, the selection of a menu selection item 52 may open a sub-menu, as is the case with the selection of the "Seat", "Appliance", or "Television" menu selection items, or may perform a function without opening a sub-menu, as is the case with the "Front Door" and "Speed 30%" menu selection items. It should be fully appreciated by one of ordinary skill in the art of wheelchair controls that the menu selection items shown may be unique to a particular user and that the menu may instead be customized to contain other menu selection items different from those shown but unique to another user.

It should be understood that the choosing and selection of the menu selection items described above is only one manner in which menu selection items can be chosen and selected, and that menu selection items may be chosen and selected in any other suitable manner, as may become more apparent in the description that follows.

The menu structure may be customized in any suitable manner. For example, menu selection items may be entered into a menu structure, as shown in function step 64 in FIG. 7. Menu structure items may be entered into the menu structure in any suitable manner, such as by selecting menu selection items from a list of items and/or by manually typing menu selection items, for example, into a field through the use of a keypad. The latter permits menu selection items to be custom labeled. A custom label may be one that the user can easily identify. Once the items are entered, the menu structure may be saved, as shown in function step 66. After menu selection items are entered and saved into the main menu, those items can be assigned a function, as shown in function step 68, if one is not already assigned. This may be done in any suitable manner. For example, functions may be selected from a list or manually typed into a field. Functions may include, for example, opening a sub-menu structure or action menu structure, or assigning a parameter value to some operation of the vehicle. Once functions are assigned to menu selection items, the functions may be saved, as shown in function step 70.

The foregoing functional steps 64-70 can be performed in any suitable manner. For example, the steps may be performed using a menu editor or designer, which may include any suitable program or software application, which may be linked to the vehicle, such as, for example, via an external device. For example, the application may be stored in a programming module, such as the programming module 42 described above. The programming module 42 may be in the form of a handheld pendant or a personal computer (e.g., a PC setup station), which may be connected to the control system 10 wirelessly or via a physical connection.

Figure 8:
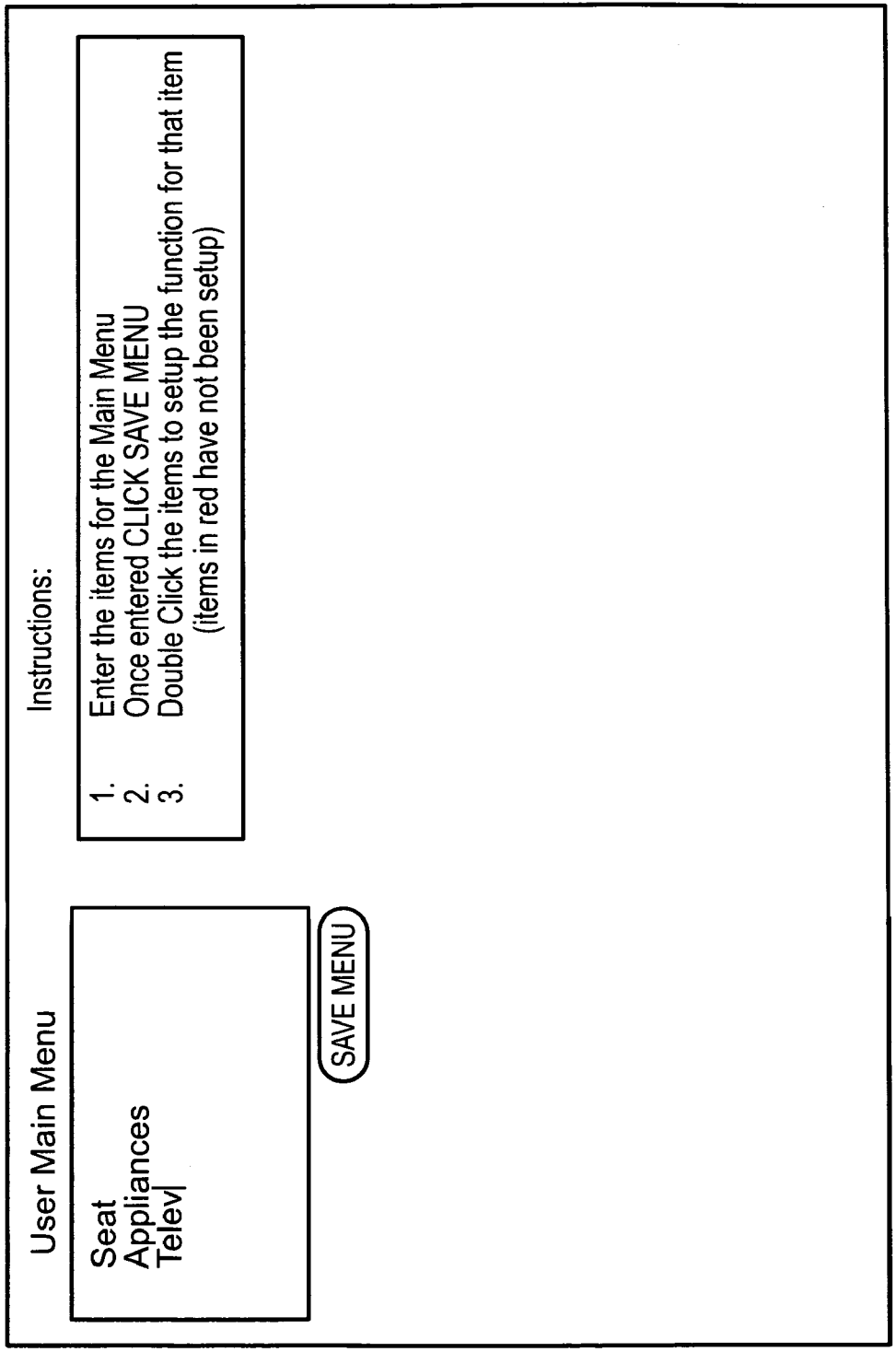
FIG. 8 is a diagrammatic representation of a menu editor window in which a main menu structure may be set up.

The application may be in the form of a user-friendly windows application. An example of an application window for setting up a menu structure is shown in FIG. 8. The window may contain instructions for structuring the menu and assigning functions to the menu selection items. Menu selection items may be entered manually into fields or selected from a list. This can be done with a keypad or a mouse, such as by typing menu selection items into a field, clicking on items in a list, or dragging and dropping items from a list into a field. The user may be prompted to identify the menu selection items by text, icon, or a combination of both text and icon. Once menu selection items are entered, the items may be saved into the menu, for example, simply by selecting a "Save Menu" button. If not already assigned, functions may be assigned to menu selection items, for example, by clicking the items to which a function is to be assigned. Then, a function may be selected, for example, from a list. Such functions may include, for example, opening a sub-menu structure or action menu structure, or assigning a parameter value to some operation of the vehicle. Once functions are assigned to the menu selection items, the functions may be saved, for example, simply by clicking a button in the window. Items that have not been assigned a function can be emphasized, pronounced, or highlighted in some manner, such as, for example, by allowing those items to appear in red font, so that those items can be easily identified.

Figure 9:
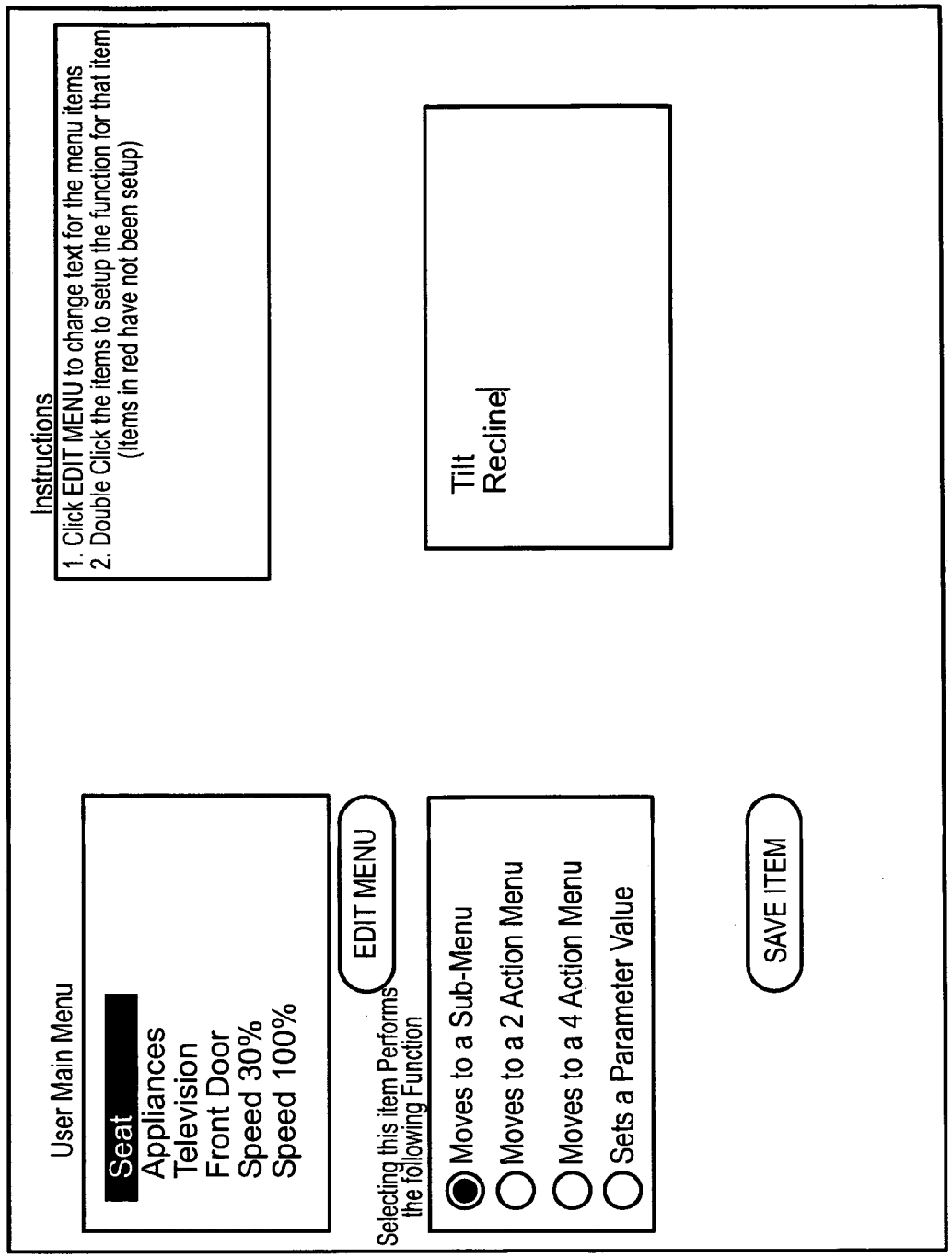
FIG. 9 is a diagrammatic representation of a menu editor window in which sub-menu selection items, action menu selection items, or parameter values may be associated with menu selection items in the main structure menu.

The menu structure may be edited once menu selection items are entered and functions are assigned. This can be accomplished in any suitable manner. For example, a menu editor, such as the editor described above, may include an application window, as shown in FIG. 9. This window may include instructions for editing the menu or menu selection items therein. An item may be edited by first selecting the item and then toggling an "Edit Menu" button. This may open a list of functions that may be assigned to the item. The functions may include, for example, opening a sub-menu structure or action menu structure, or assigning a parameter value to some operation of the vehicle. A function can be selected by scrolling up or down the list to a desired function and then selecting an enter key, or by clicking on a desired function with a mouse. Alternatively, a function may be dragged and dropped from a function list into a designated field. As yet another alternative, a function may be manually entered by typing a string of characters into a field via a keypad. The characters could designate function commands, control paths, and values, wherein the microprocessor 36 of the control system 10 may enter a control mode based on the interpretation of the commands, control paths, and values. The selection of a sub-menu function may require the entry of menu selection items, such as the items labeled "Tilt" and "Recline" in the sub-menu shown in FIG. 9. Functions may then be assigned to these items. Once functions are assigned, the items may be saved, for example, by selecting a "Save Item" button, as shown in the drawings.

Figure 10:
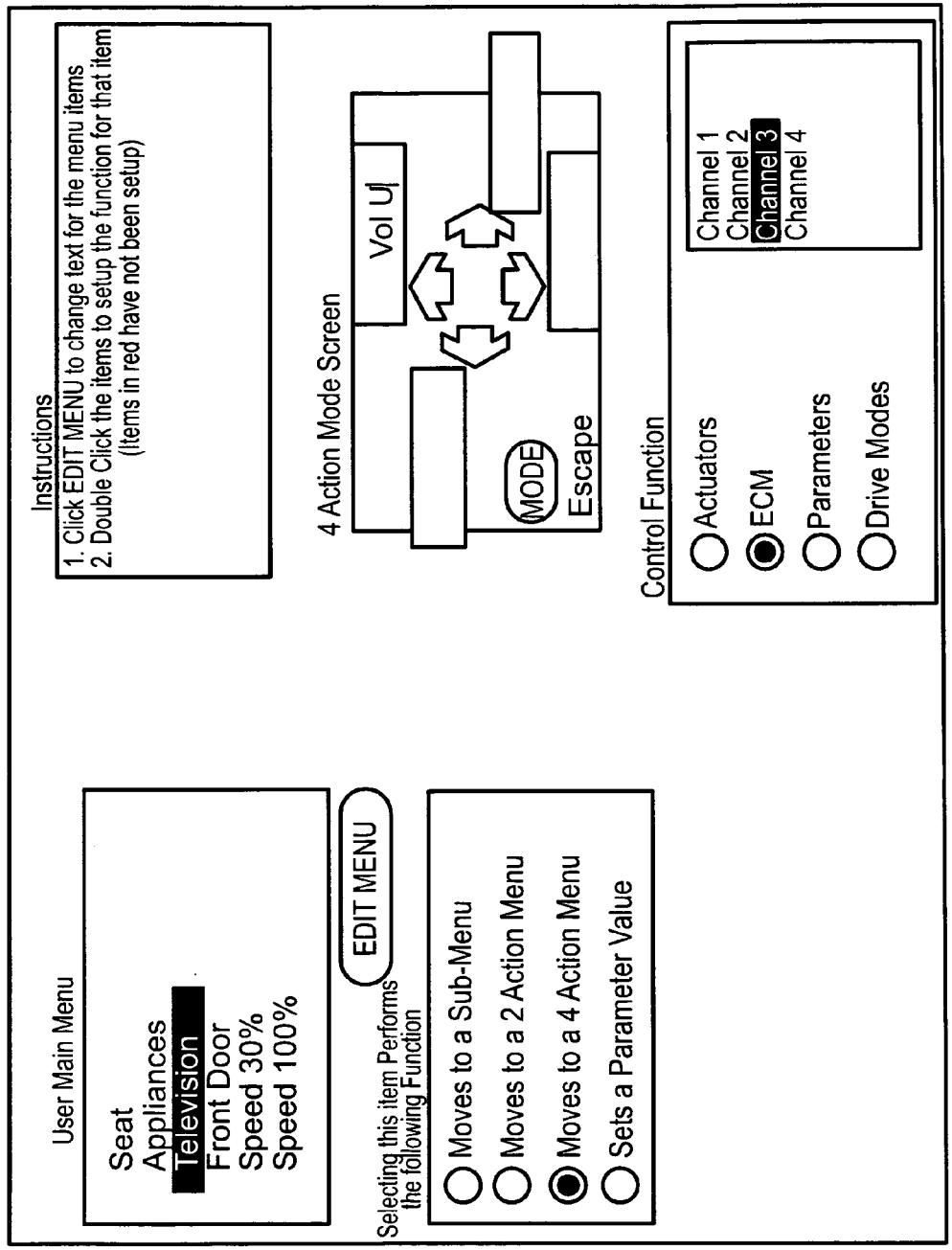
FIG. 10 is a diagrammatic representation of a menu editor window in which an action selection item is selected and assigned a function.

Another example of an application window for a menu editor is shown in FIG. 10. This window includes an "Action Mode" screen and "Function Control" screen, which pop up upon selection of an "Action Menu" selection from the function list. An action menu is created in the "Action Mode" screen. In this screen, menu labels may be created for action menu selection items. Control functions may be assigned to menu selection items in the "Control Function" screen. In the window illustrated, a menu selection item labeled "Television" is selected and the "Edit Menu" button is toggled. This opens a function list. A "Moves to a 4 Action Menu" function is chosen from the list. This opens an action menu having four action selection items therein. The action selection items can be labeled, for example, "Vol Up", "Vol Dn", "Ch Up", and "Ch Dn". Any number of items or labels can be inserted. In the illustrated window, the action selection item labeled "Vol Up" is directed to a control function labeled "ECM Channel 3", which is through channel three of the environmental control module 20. An infrared device could be connected to a pin associated with this channel for controlling the volume of a television.

It should be understood that the invention is not intended to be limited to the application shown and described above and that other applications may be suitable for carrying out the invention. For example, user-friendly menu selection items having pre-assigned functions may be selected from a list. This may include menu selection items that function to open a particular sub-menu structure with certain menu selection items therein or a particular action menu structure that has certain action selection items therein. For example, the menu selection item "Television" may have associated with it action selection items, such as "Vol Up", "Vol Dn", "Ch Up", and "Ch Dn", which are functions that are commonly associated with the operation of a television. Such action selection menu items are shown, for example, in FIG. 4.

It should also be understood that a menu editor application may be integral with the vehicle, as opposed to being removably linked to the vehicle. The operation of such a menu editor may be viewed on the vehicle display module 32 and controlled via a hand control module or a specialty input device. For example, the hand control module 12 or a specialty input device 22 shown in FIG. 1 and described above may be provided with a "PROGRAM" button that can be selected to edit the menu structure. Upon selecting this button, a menu or action selection item that is currently being used may be placed in the main menu structure. Alternatively, this button may be selected and then the hand control module 12 or a specialty input device 22 may be used to navigate through the menu to a menu selection item. Depressing this button a second time could place the selection item in the main menu.

It should be appreciated that the menu structure need not be structured or edited by a program module with a software application that performs menu editing but rather may be structured or edited by someone skilled in designing menu software or algorithms.

It should also be appreciated that the menu structure may be provided with a user menu for placement of menu selection items that are most frequently accessed by the user, as will become more apparent in the description that follows.

Figure 11:
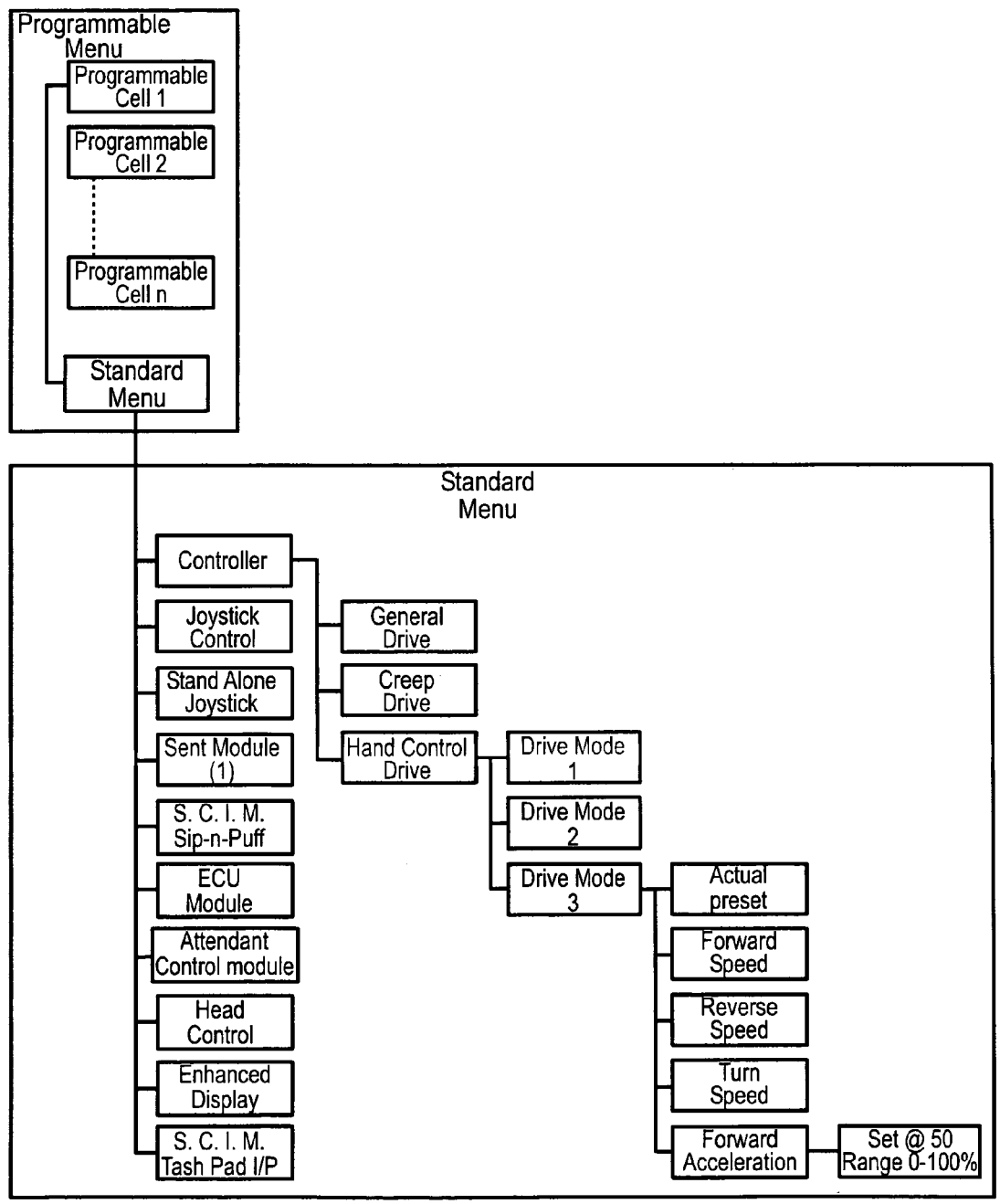
FIG. 11 is a diagrammatic representation of a menu structure that, in addition to including customized menu selection items, includes a standard menu selection item that opens a standard menu.

It should further be appreciated that the menu structure, in addition to having a customizable menu structure, as described above, may include a standard menu structure (i.e., a non-customized or default factory installed), which may be opened, for example, by selecting a menu selection item labeled, for example, "Standard Menu", as shown in FIG. 11. The standard menu structure may be provided with pointers that point to standard menu selection items that correspond to control modes of the electronic control system 10. The standard menu structure may be set up logically from general menu selection items to more specific menu selection items. As an example, a general or top-level menu structure may include menu selection items, such as "Controller", "Joystick Control", "Stand Alone Joystick", "Seat Module", "S.C.I.M. Sip-n-Puff", "ECU Module" (i.e., an environment control module), and the like. By selecting one of these menu selection items, such as "Controller" the user may move to more and more specific menu selection items, such as "General Drive", "Creep Drive", or "Hand Control". Activating a particular control mode may require the selection of several menu selection items, as is clearly illustrated in FIG. 11 when setting "Forward Acceleration".

Another example of a menu structure is shown in Table I below.

TABLE I

| Main Menu | Sub-Menu | Action Menu |
|---|---|---|
| Drive | | |
| Drive Setup | | |
| Actuators | → Actuator 1 | |
| Environ Ctrl | Actuator 2 | |
| | Actuator 3 | → Up |
| | Actuator 4 | Down |

In Table I, a main menu structure is depicted in the left column, a sub-menu structure is depicted in the center column, and an action menu structure is depicted in the right column. Each of these menus has exemplary selection items. To activate the seat recline actuator (represented by "Actuator 3") downward, the user scans the menu structure six times and selects three items. For example, the user scans from "Drive" to "Actuators", and then from "Actuator 1" to "Actuator 3", and then from "Up" to "Down" and selects items labeled "Actuators", "Actuator 3", and "Down". Upon selecting the "Down" action selection item in the "Actuator 3" action menu structure, the control system program would jump to a portion of the program that drives the seat-recline actuator in the downward direction.

The customizable menu structure, as described above, permits the user to select menu selection items, for example, that are accessed most often, and place the menu selection items into the top level menu structure (e.g., user menu) or main menu structure. This menu structure would preferably be displayed first when the user initially accesses the program embedded in the memory 38 of the electronic control system 10 (e.g., when the vehicle is initialized or turned on).

The customizable menu structure may be driven by a program embedded in the memory 38 of the electronic control system 10, which may set up and initialize an array that could hold information for managing the customizable menu. For example, for each menu selection item, the array could hold three variables, including "Menu Label", "Action", and "Value". With these variables, a menu structure could be created and controlled. The "Menu Label" variable could contain the text or icon that is displayed in the menu structure. The content of the label may be associated with a particular action and may be customized to more easily identify the action for a particular user. For example, instead of "Actuator 3" in the example above, the text displayed in the menu structure could read "Recline". This may be particularly useful for identifying environmental controls (i.e., "Environ Ctrl"), since such controls could control various things in the user's environment, such as appliances (i.e., accessories), doors, or room lights. This is especially useful for children and the cognitively impaired.

The second variable in the array, "Action", could specify the action mode and control function that could be activated by selecting the menu selection item. When the user makes a selection from the customizable menu structure, control could be passed to a command parser. The command parser could compare the value held in the "Action" variable to a list of possible actions. Upon finding a match the command parser could send control to the appropriate place in the control system program, which would complete the referenced action (i.e., enter the selected action mode and perform the associated control function).

The last variable in the array could hold a "Value", if desired. As an example, if the "Action" is "Maxspeed", the "Value" variable would hold the desired setting for the maximum speed. In this way, the user could easily set the maximum speed to 70 percent. The "Value" could also be a relative setting. For example, if the "Value" is +10, the maximum speed could be incremented by 10 percent.

The user customizable menu may be driven by a program that may access a lookup table, a database, or linked list. The list may include information, such as Menu ID, Title, Function Type, and Details. An example of such a list is shown in Table II below.

TABLE II

| Menu ID | Title | Function Type | Detail |
|---|---|---|---|
| 0 | "Main User Menu" | Menu | 1, 2, 3, 4, 5, 6 |
| 1 | "Seat" | Menu | 7, 8 |
| 2 | "Appliances" | 4-Action | 9, 10, 11, 12 |
| 3 | "Television" | 5-Action | 13, 14, 15, 16, 17 |
| 4 | "Front Door" | ECU | 4, 2, 2, 500 |
| 5 | "Speed 30%" | Param | 124, 30 |
| 6 | "Edit Drive 1" | Jump | 358 |
| 7 | "Tilt" | 3-Action | 18, 17, 19 |
| 8 | "Recline" | 3-Action | 18, 17, 19 |
| 9 | "Television" | ECU | 2, 1, 4 |
| 10 | "DVD" | ECU | 2, 2, 4 |
| 11 | "VCR" | ECU | 2, 3, 4 |
| 12 | "Stereo" | ECU | 2, 4, 4 |
| 13 | "Vol Up" | ECU | 3, 1, 1 |
| 14 | "Ch Dn" | ECU | 3, 2, 1 |
| 15 | "Vol Dn" | ECU | 3, 3, 1 |
| 16 | "Ch Up" | ECU | 3, 4, 1 |
| 17 | "Drive" | Drive | |
| 18 | "Tilt Up" | Act | 3, 1 |
| 19 | "Tilt Dn" | Act | 3, 0 |

A first menu item (i.e., Menu ID 0) in Table II is entitled "Main User Menu". This is indicated by the text stored in the Title field. This text may be customized according to the user preferences. This record may function as a menu and more particularly, a sub-menu. As indicated in the Detail field, Menu ID 1 through 6 could be included in the first menu item (i.e., the main user menu). This is clearly illustrated in FIG. 2. Each of these items has a menu function assigned to it as well.

Menu ID 1, "Seat", is assigned a menu function. It functions as a sub-menu. This sub-menu is composed of two menu items (i.e., Menu IDs 7 and 8). When the "Seat" menu item selection is selected in the main user menu, a sub-menu would open. The sub-menu includes two menu selection items, namely, "Tilt" and "Recline". When the "Tilt" menu selection item is selected, a 3-Action menu opens. The 3-Action menu is composed of three menu items. Only three items are assigned in this menu, as shown in FIG. 2, since "Escape" is assigned to the left arrow. The "Escape" function moves control back to the previous menu. The three assigned items of the 3-Action menu are Menu IDs 17, 18, and 19. Menu ID 17 has the function of "Drive". This function exits the user main menu and puts the vehicle in drive mode. The other two items activate a seat actuator function. "Tilt Up" activates the seat actuator to drive the seat in the upward (i.e., "up" (1)) direction. "Tilt Dn" activates the same actuator to drive the seat in the downward (i.e., "down" (0)) direction.

Menu ID 8 also activates an actuator. This item, entitled "Recline", activates actuator 1, which reclines the seat, in a toggle mode (2). In this mode, every time the "Recline" menu selection item is selected, the actuator (i.e., actuator 1) is driven in a different direction. In this way, the actuator may be toggled to be driven up and down. The remaining menu items have assignments in a similar manner.

Menu ID 2 activates a 4-Action menu having four assigned items, including Menu IDs 9-12. Examples of the 4-Action menus are illustrated in FIGS. 3 and 4. These four items activate Environmental Control Module (ECM) outputs. The ECM is a special output module that controls output pins arranged in channels or groups of four pins. Menu IDs 9, 10, 11, and 12 each controls a pin on channel 2. Each of these items toggles the output of the ECM pin. In this example, one of five control methods is possible. Possible control methods in this example include Momentary, Pulse, On/Off, and Toggle. In the Momentary control method, an output relay is held closed as long as the selection remains. In the Pulse control method, the relay closes for a specific period of time, preferably in milliseconds (e.g., 2,500). In the On/Off control method, the relay opens or closes (e.g., 3,1=open and 3,0=closed). In the Toggle control method, the current state of the output is toggled (i.e., if the output is "On", the output will be turned "Off"; and if the output is "Off", the output will be turned "On").

Another function that is available in the main user menu is a parameter modification. An example of a menu selection item for modifying a parameter is illustrated in FIG. 6. Parameters are variable settings that the vehicle program uses to affect the way the vehicle drives and operates. Menu ID 5 is entitled "Speed 30%". When this item is activated, the parameter designated by the first number (i.e., 124) in the Detail column is set to a second number (i.e., 30). In this way, the user can easily set parameters without the need to navigate through the standard menu structure. If the parameter number is prefixed by a "+" symbol, the parameter would be incremented by 30 (e.g., for the parameter +124, 30, the speed would be incremented by 30%). If the Parameter number is prefixed by a "−" symbol, the parameter would be decremented.

The last function, which is yet unexplained, is the Jump function. Item 6 in Table II is labeled "Edit Drive 1". This function moves control to a point in the list, in this case, Menu ID 358, where Drive Profile 1 is modified in the standard menu structure. When this command is issued, the subsequent action is as though the user navigated to the standard menu structure and down to a specific menu selection item within the standard menu structure. This function saves a significant amount of effort on the part of the user to navigate through the menu structure.

It should be understood that the program and linked list described above is provided for illustrative purposes. In broader terms, a menu selection item may be a user interface object that sends an action message to a target. For example, the menu selection item labeled "Tilt" may send an action message or control function (e.g., "up" and "down") to an actuator that causes the seat to tilt when selected. The menu selection item may send an action message to a target once if momentarily selected, but can also send an action message or control function continuously, as long as the menu selection item is continuously selected, for example, by holding a joystick in some direction continuously. The appearance (i.e., menu label) of the menu selection item can be customized to include text, icons, or a combination of text and icons, according to the preferences of a particular user. Similarly, the action message or control function can be programmably assigned or otherwise associated with each menu selection item, and the target to which the action message or control function is sent, can be customized for the user.

It should be appreciated that the menu structure may include one or more main menus, including, for example, the main menu and the user or driver menu, in a high level of the menu structure, or at the top of a menu tree, and that a menu selection item may be moved from a lower level (i.e., a sub-menu) to a higher lever (e.g., the main or user menu), or copied to a higher level if the menu is fixed, that is, if it has static menu selection items. In this way, the main menu or user menu may be a dynamic menu, and the manner in which the menu selection item is accessed (i.e., selected) by a user can be readily (e.g., with the need to program in code) and selectively changed. In other words the user need not navigate or drill down through the menu structure to control a module or function of the vehicle.

It should be further appreciated that the personal mobility vehicle may include a standard menu structure having fixed menu selection items and that one or more shortcuts may point to fixed menu items, to avoid the need to frequently navigate through seldom-used portions of a standard menu structure. For example, the personal mobility vehicle may include a standard menu structure in the form of a main menu and a user menu in the form of a driver menu for placement of shortcuts. An example of such a vehicle is set forth in the description that follows.

Figure 12:
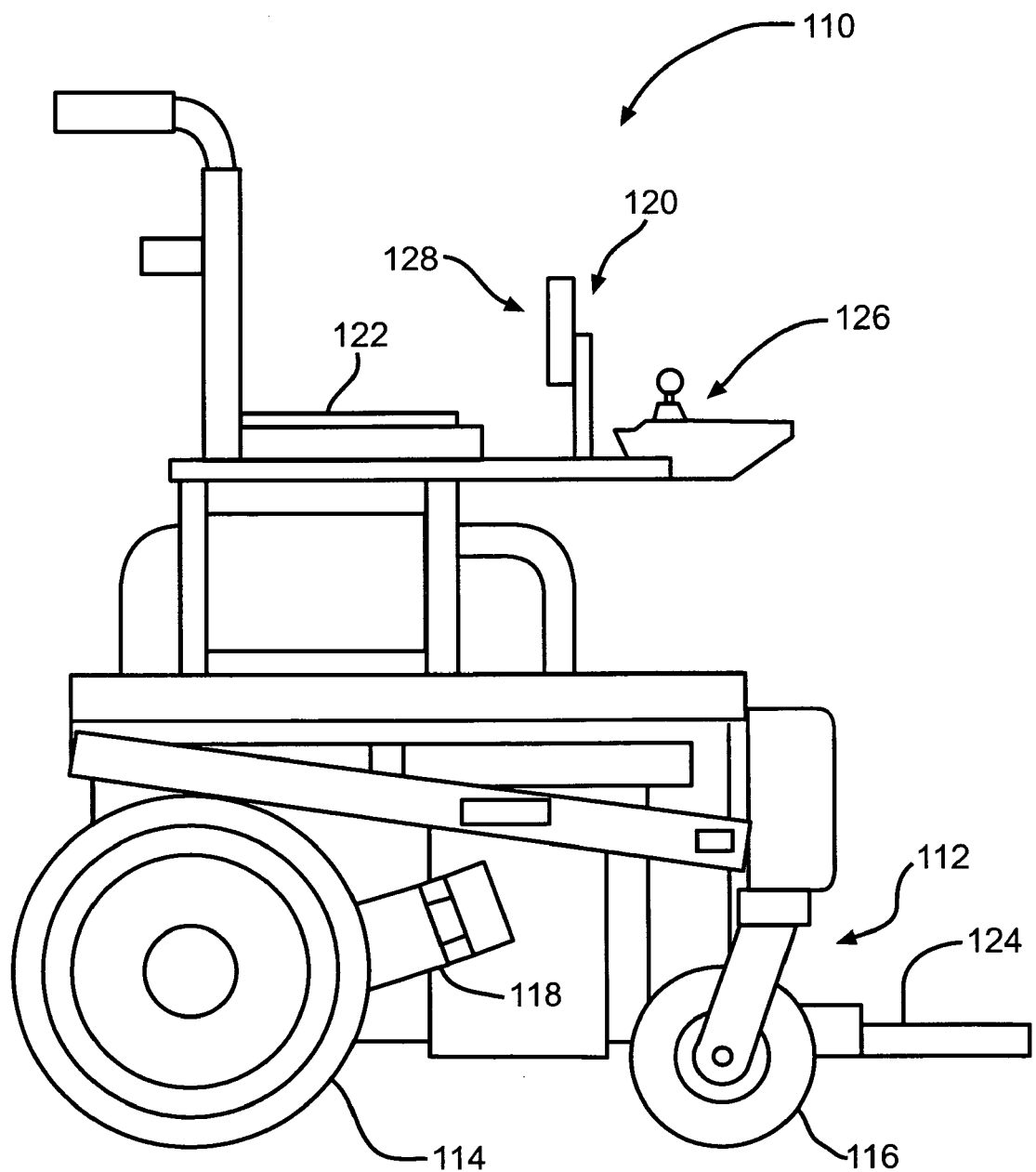
FIG. 12 is a side elevational view of an example of a power wheelchair.

An example of a personal mobility vehicle in the form of a power wheelchair is generally indicated at 110 in FIG. 12. The wheelchair 110 may comprise a chassis 112, which may be inclusive of a frame, and which is supported for movement in relation to a supporting surface (i.e., the floor or ground) by one or more wheels, such as the drive wheels 114 and the casters 116 shown. The drive wheels 114 may be driven by one or more drive motors 118. The chassis 112 may be dimensioned and configured to support various wheelchair components, such as but not limited to a battery tray for supporting one or more batteries for providing power to the wheelchair 110, a wiring assembly for supplying power to, and communication between, various electronic components of a chassis control system and optional electronics, and a power seat system 120 for supporting a user. The power seat system 120 may be of the type that tilts and/or lifts and reclines, and preferably has opposing armrests 122 for supporting the user's arms and leg rests 124 for supporting the user's legs. The armrests 122 may support for the attachment one or more user interface devices, such as the hand control module 126 and the display module 128 shown. The term hand control module may be loosely interpreted as an input. The various electronic components may include a motor controller for controlling drive motors 118 and various other general functions of the wheelchair 110, a specialty input control module for controlling specialty control inputs (e.g., a sip-n-puff, a head array, a head or chin control, or a mini joystick), an actuator controller for controlling one or more actuators (e.g., seat tilt, lift and recline actuators and leg rest actuators), and an environmental control module for interfacing with environmental devices, including but not limited to infrared (IR) devices, radio frequency (RF) devices, or other wireless devices. To simplify the description that follows, environmental devices referred hereinbelow will be limited, by example, to infrared receptive devices, though the environmental control module may interface with other environmental devices.

Figure 13:
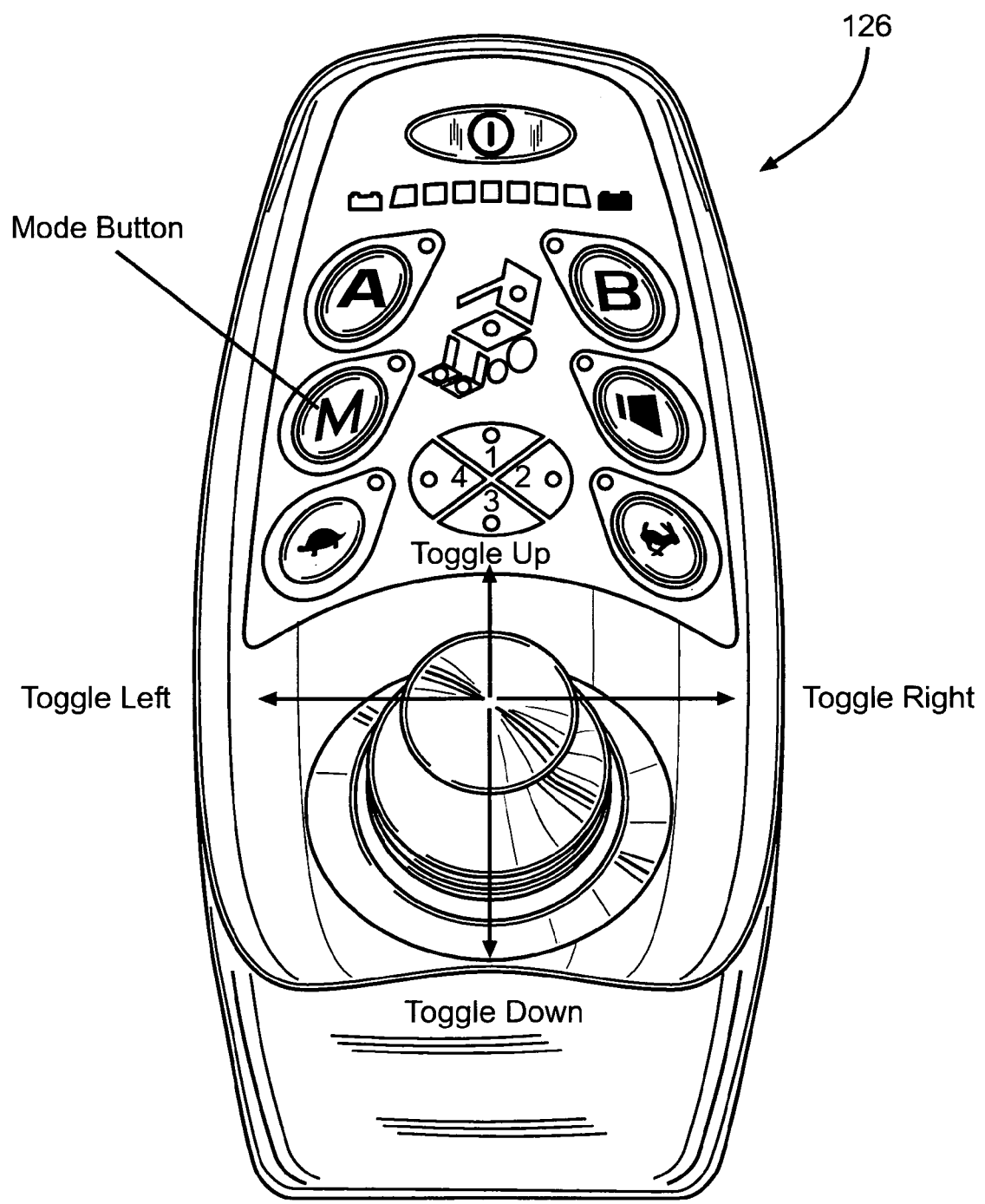
FIG. 13 is a top plan view of an example of a hand control.

In FIG. 13, there is illustrated an example of a hand control module 126, which is in the form of a seven-button joystick control having, for example, an on/off or power button, programmable buttons (i.e., buttons labeled "A" and "B"), and mode, horn and drive speed buttons. The hand control module 126 may also include graphic indicators, such as the battery gauge (i.e., bar graph), seating function (i.e., wheelchair graph) and drive profile (i.e., four-section pie graph) indicators shown, to aid the user in operating the wheelchair. It should be appreciated that other hand control modules and inputs, including specialty inputs (e.g., a sip-n-puff, a head array, a head or chin control, or a mini joystick), may be employed. The description that follows will refer to the mode button and toggle directions (or commands), such as the up, down, left and right toggle directions shown. Similar toggle directions (or commands) may be achieved with other hand control modules or inputs, including specialty inputs (e.g., a sip-n-puff, a head array, a head or chin control, or a mini joystick).

Figure 14:
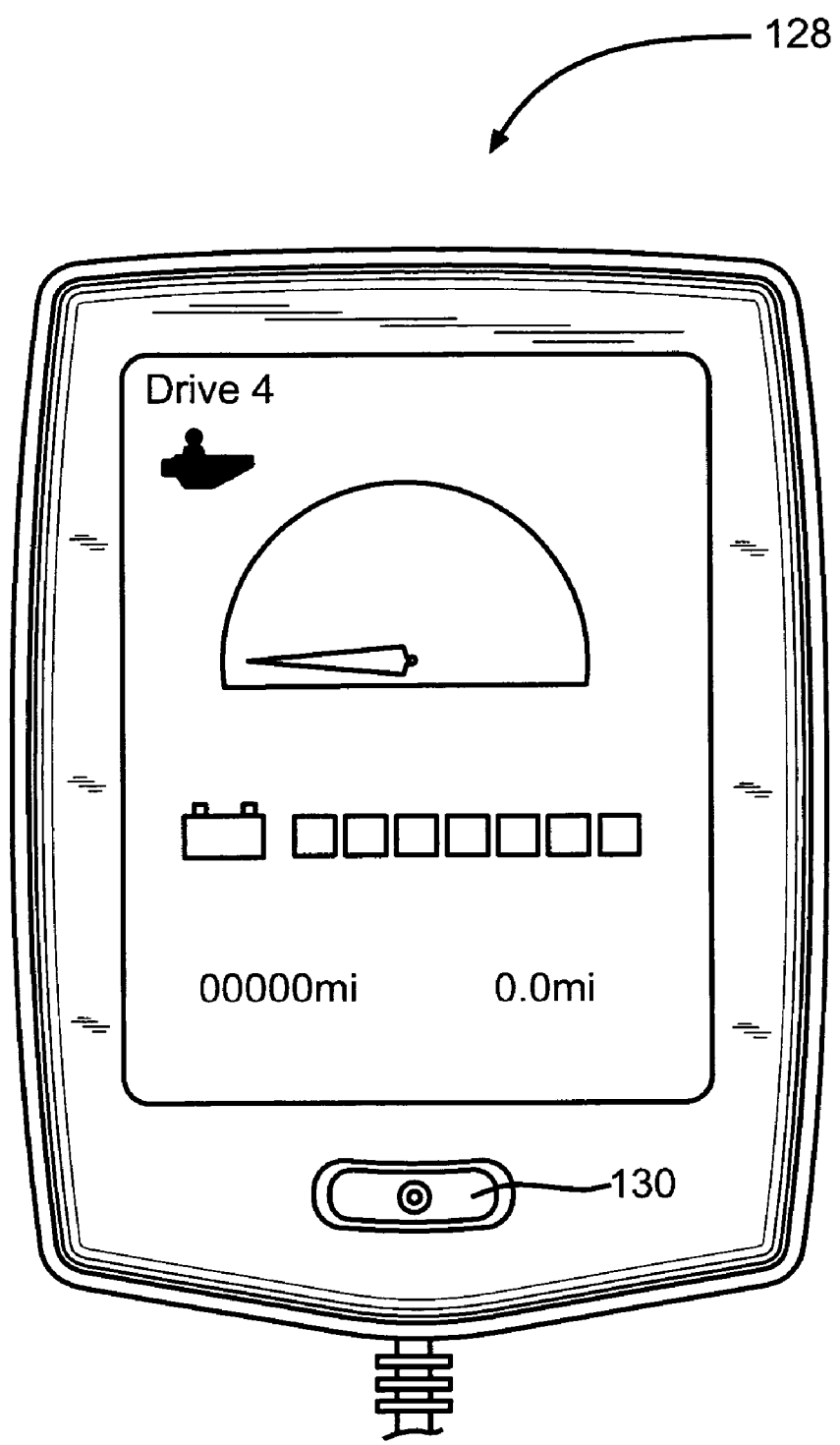
FIG. 14 is an elevational view of an example a display module showing a drive display.

In FIG. 14, the front of the display module 128 is illustrated as having a power switch 130, which turns on and off the display module 128 and preferably the power wheelchair 110. When the display module 128 is turned on, there may appear a drive display that comprises a ready-to-drive screen. This screen may be like a dashboard in that it may indicate the current drive profile (e.g., "Drive 4"), the type of input device being used—in this case, a hand control module (i.e., in the upper left corner when viewing FIG. 14), a speedometer, an odometer and a trip odometer, a battery indicator, and a speed tick mark, which may indicate the maximum speed available in the current drive profile. When this screen is displayed movement of the hand control module 126 may cause the wheelchair 110 to move. The drive display may provide real-time feedback about the wheelchair's performance to allow the user to more easily gauge the operation of the wheelchair. To move to a driver menu, the user may simply press the mode button.

Figure 15:
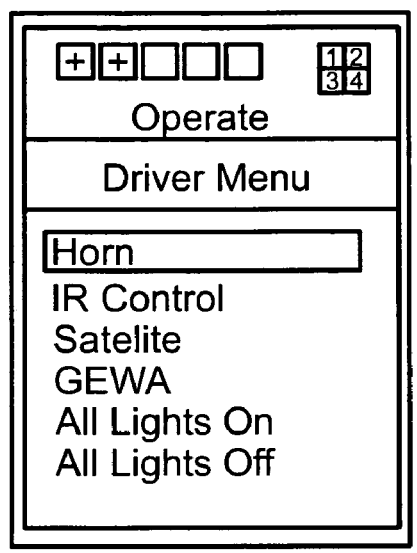
FIG. 15 is a diagrammatic representation of the display module showing a driver menu.

The driver menu, as is illustrated in FIG. 15, which may be viewed on the display module 128, may comprise a list of shortcuts to the most commonly used non-driving related menu items (or functions) by the user. These menu items act as shortcuts to save time. The presence of the driver menu permits the user to easily alternate between driving and the most pertinent or frequently used non-driving functions. From this menu, the user can return to the drive display by simply pressing the mode button or quickly toggling the joystick to the left, or if the wheelchair is provided with a timed function, by waiting a predetermined amount of time. To enter a main menu, the user may toggle the joystick to the left and hold the joystick in this position for a predetermined period of time (e.g., five seconds). It should be appreciated that menu items can be added or deleted using a programming module, as described above, and as will become apparent hereinbelow.

Figure 16:
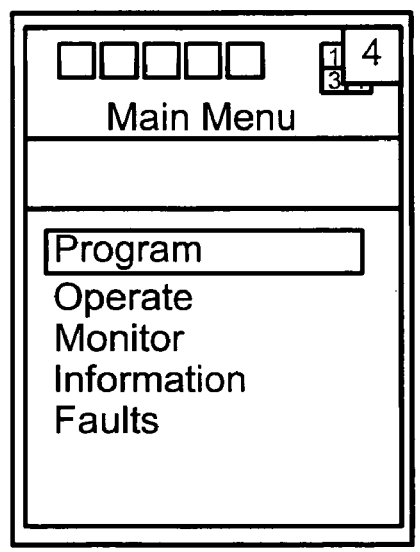
FIG. 16 is a diagrammatic representation of the display module showing a main menu.

The main menu, as is illustrated in FIG. 16, which also may be view on the display module 128, may be the starting point of the electronic menu tree and may contain all the available main menu selection items accessible through the display module 128. The available main menu selection items in the illustrated main menu include program, operate, monitor, information, and faults. To return to the drive menu, the user may simply press the mode button, toggle the joystick to the left, or if a timed function is provided, wait a predetermined amount of time.

Figure 17:
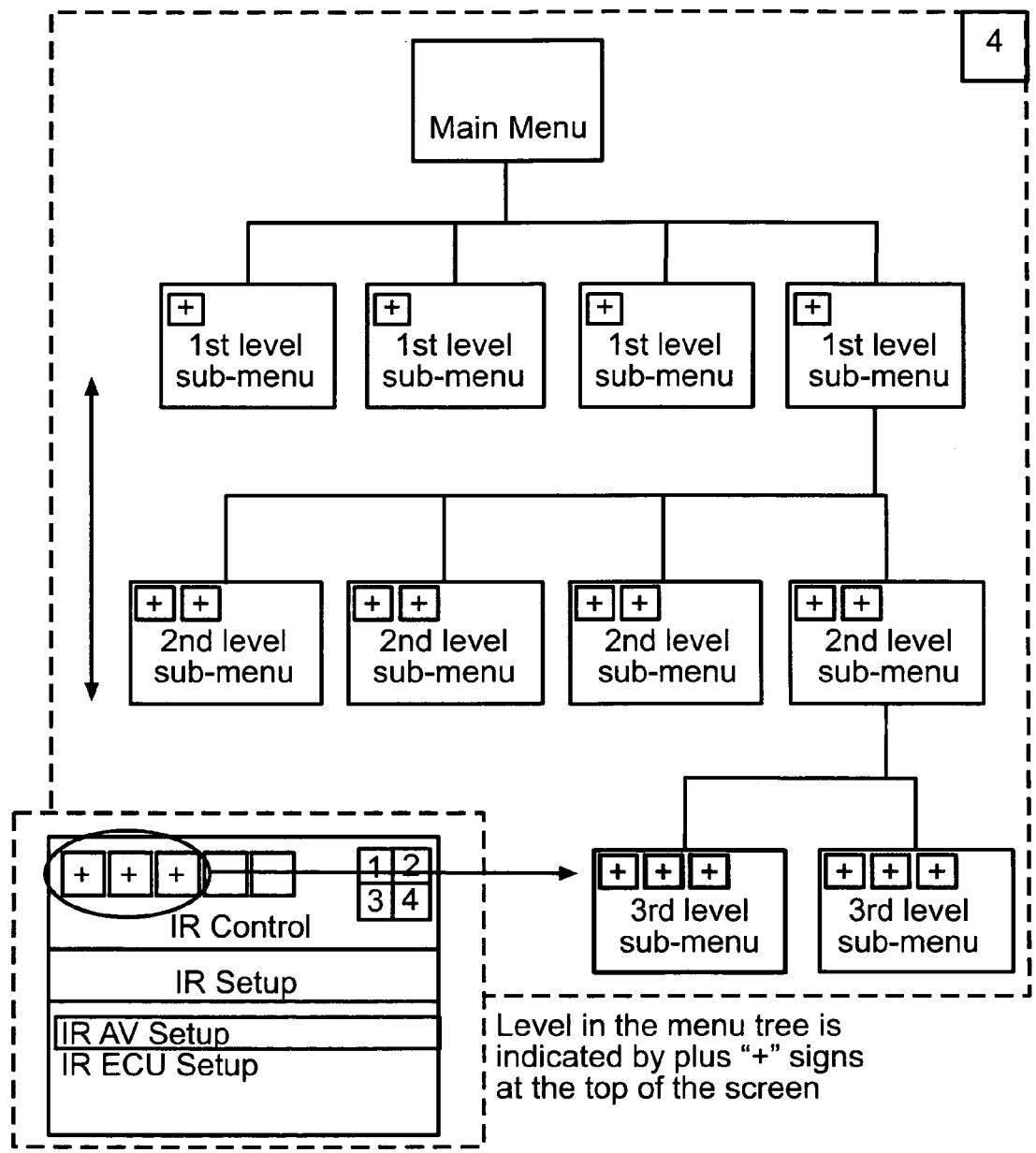
FIG. 17 is a diagrammatic representation of an example of the main menu as the top menu in an expansive menu tree.

The main menu may be the top menu in an expansive menu tree, as illustrated in FIG. 17. To navigate or move up or down the menu screen (illustrated in FIG. 16), the user may simply toggle the joystick up or down. Similar up or down commands can be achieved with other hand control modules or inputs. To move up and down a menu tree (illustrated in FIG. 16), the user may simply toggle the joystick left or right. Similar left or right commands can be achieved with other hand control modules or inputs. The level in the menu tree may be indicated by a plus sign at the upper top (or at another location) of the display screen, as illustrated in FIG. 16.

There may be different user access levels in the display module 128. One level (i.e., driver and faults) may allow the user to access to the driver menu and fault codes. Another level (i.e., operate and faults) may allow the user to operate the wheelchair seat as well as specialized controls (e.g., a sip-n-puff, a head array, a head or chin control, or a mini joystick). Another level (i.e., operate, monitor, information and faults) may further allow wheelchair functions to be monitored. Yet another level (i.e., program, operate, monitor, information and faults) may add the ability to program basic and more advanced wheelchair functions.

It should be appreciated that the control system may have an auto-scan feature to aid the user in navigating through the menu structure. The auto-scan feature may automatically scroll up or down a menu and pause at each menu selection item to allow the user to select that item, for example, to navigate into a sub-menu. For example, with reference to FIG. 12, upon entry into the main menu, or upon quickly or momentarily toggling the joystick, the auto-scan feature will automatically scroll through the menu selection items. The auto-scan feature may pause momentarily at each menu selection item (e.g., "Program", "Operate", "Monitor", "Information", and "Faults", as shown in FIG. 12) to allow the user to select an item, for example, by toggling to the right or left. By toggling to the right at a menu selection item, the user may enter into a lower level menu (e.g., a sub-menu as illustrated by example in FIG. 17). The auto-scan feature may then automatically scroll trough the menu selection items in the lower level menu, momentarily pausing at each menu selection item, giving the user opportunity to select an item. By toggling to the left at a menu selection item, the user may enter into a higher level menu. The auto-scan feature may then automatically scroll through the menu selection items in the higher level menu, momentarily pausing at each menu selection item, giving the user opportunity to select an item.

Figure 18:
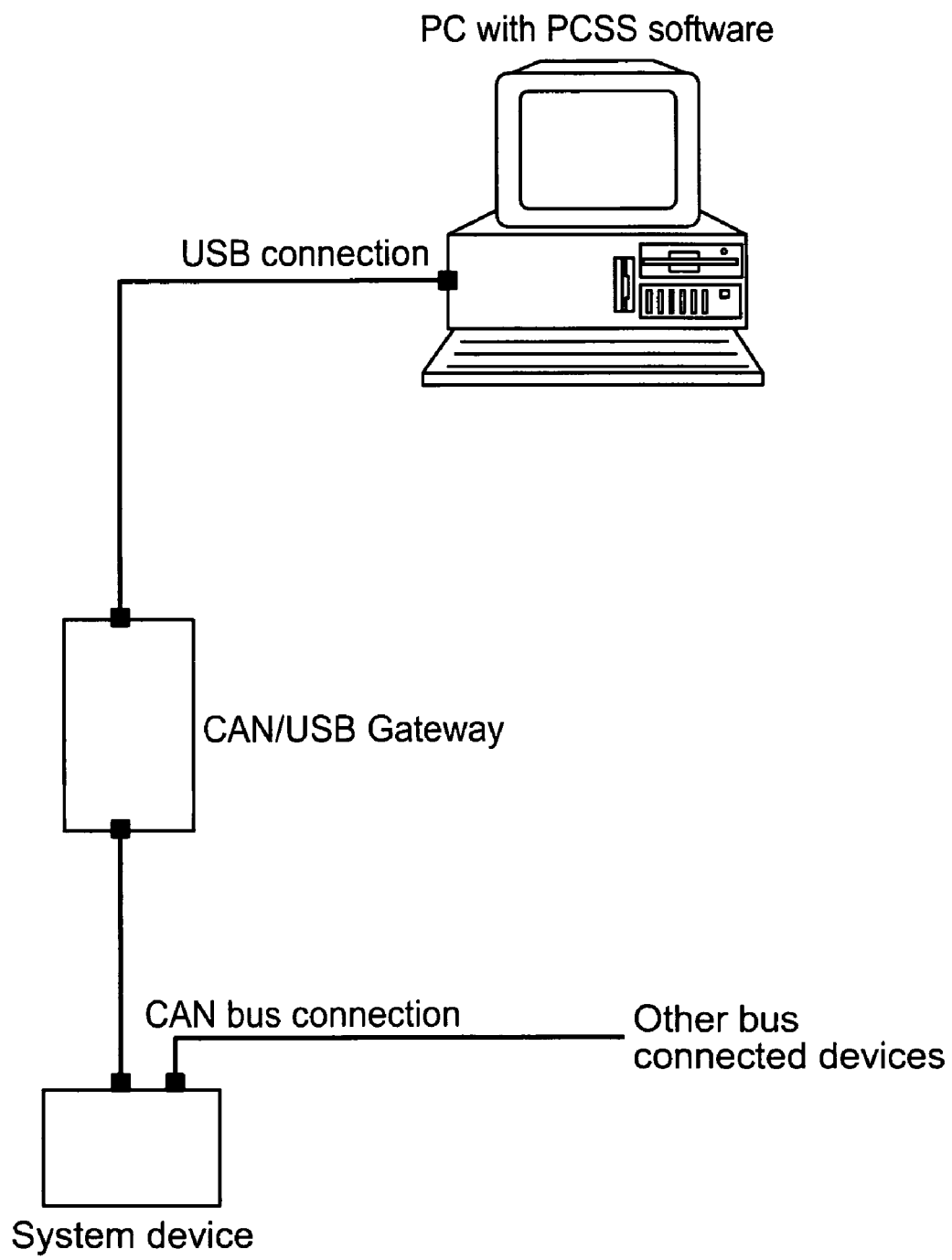
FIG. 18 is a schematic representation of the control system connected to a personal computer setup station (PCSS) via a CAN/USB Gateway.

One or more menus may be structured, for example, using a tool such as a programming module in the form of a handheld programmer or a personal computer setup station (PCSS). With the PCSS, system module settings or parameters may be altered and saved to and restored from disk. The PCSS may be connected to the control system 10 via, for example, a CAN Gateway or dongle. For example, the PCSS may be connected to the control system 10 via a USB port through an interface module to any uncommitted CAN bus port, as shown in FIG. 18. In this way, program files may be stored in a machine code and the gateway or dongle may prevent tampering, interference or corruption of the program files.

The PCSS may be used with one or more modules or controllers, including but not limited to motor control modules, hand control modules, actuator control modules, such as, for example, for the power seat systems, specialty input control modules, environmental control modules, handheld programmers, and attendant control modules. In addition to structuring or setting up menus, the PCSS may, for example, set parameters, perform calibration, set drive profiles, monitor performance, assign functions to buttons, such as, for example, on the hand control, perform diagnostics, display faults, update software, and permit OEM setup.

The PCSS may support access rights grouped, for example, as user, dealer and OEM access rights. User rights, for example, may be limited to setting parameters. Dealer rights, for example, may be limited to detecting erroneous modules, storing and rewriting parameters, and updating software. OEM rights, for example, may be the highest access rights and may allow more detailed analysis and setting changes. The OEM may use the PCSS as a production tool for end-of-line programming.

The PCSS may include a processor, memory, a windows operating system, and an uncommitted USB port. The user interface of the PCSS may include graphic elements like menu bars, tool bars, and status bars. User interactions with the PCSS may be accomplished by means of a mouse and/or keyboard.

Figure 19:
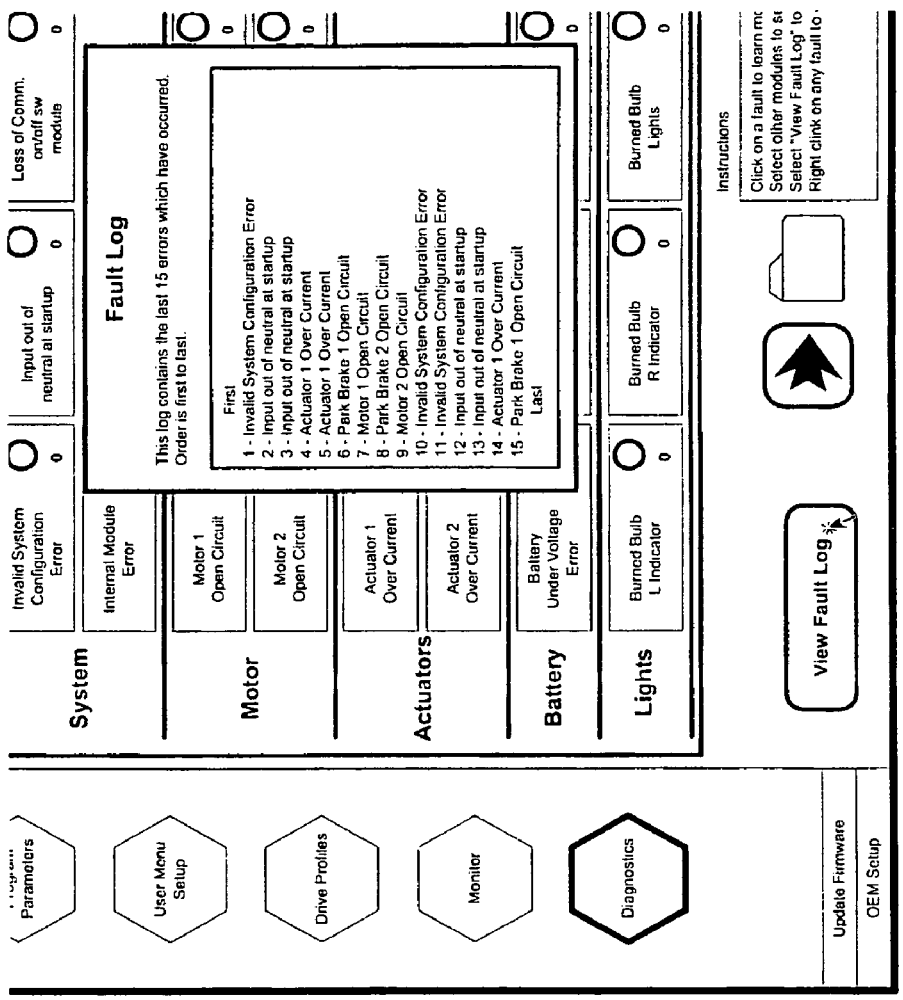
FIGS. 19-29 are diagrammatic representations of exemplary windows of the PCSS.

The PCSS may include a menu, such as the "Operate Menu" shown in FIG. 19, which may include user operable functions, for example, relating to driving, control of the power seat system and environmental control module. The Operate menu may include a special menu called, for example, the "User Menu". The user menu may be customized to include functions that are most frequently used or accessed by the user. The User Menu may be structured, for example, with a sub-program called, for example, the "User Menu Setup" in the PCSS. The PCSS may permit the structuring of the User Menu with the most frequently accessed menus, to arrange the order of the menu for speed of access, and to edit the text in the menus or functions. The User Menu may be structured by dragging and dropping sub-menus and functions. With the ability to readily change (e.g., without programming in code) the position of menu items in the tree and to edit menu descriptions, a tree can be structured to access the menu, menu items or functions that the user most often uses.

Figure 20:
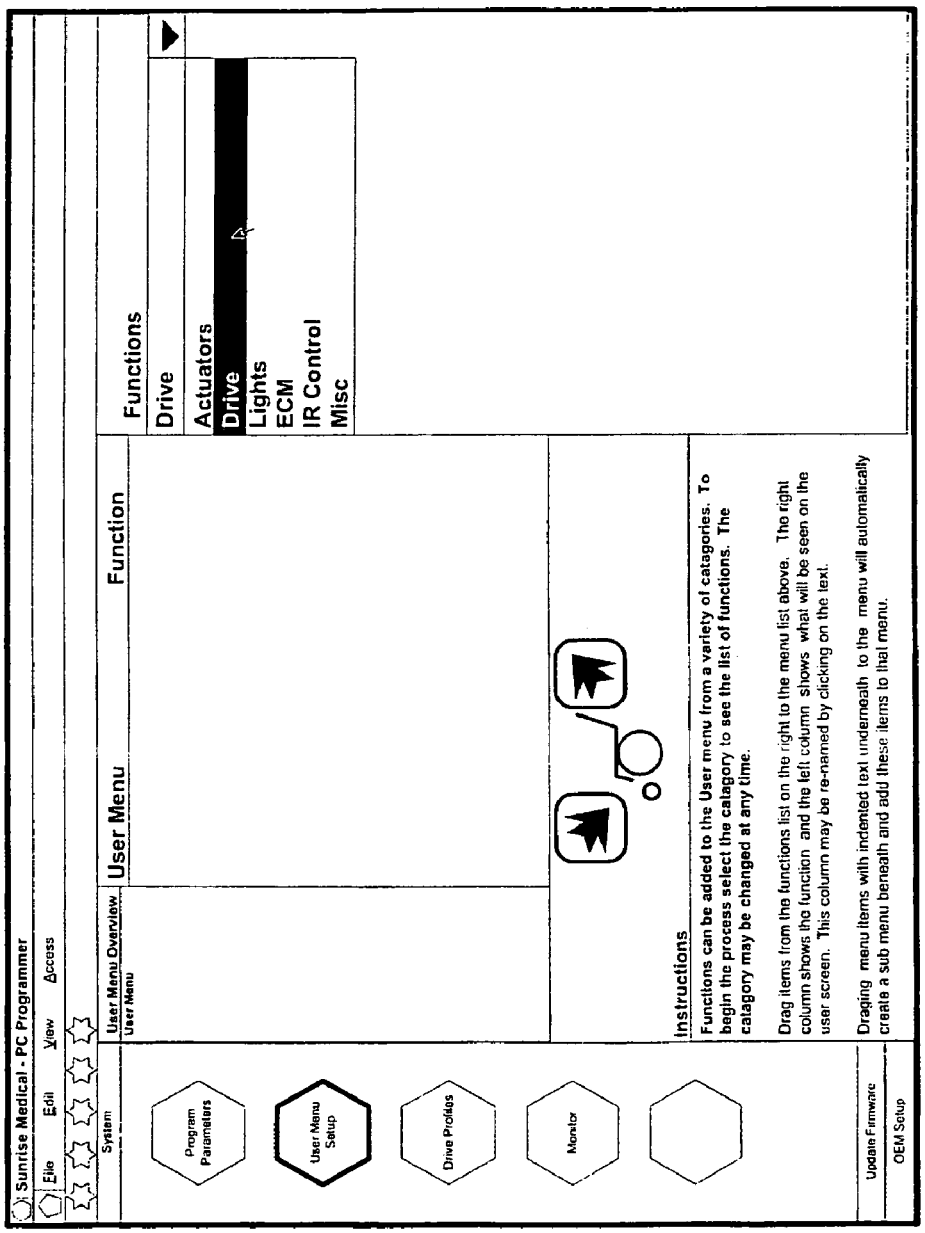
Figure 21:
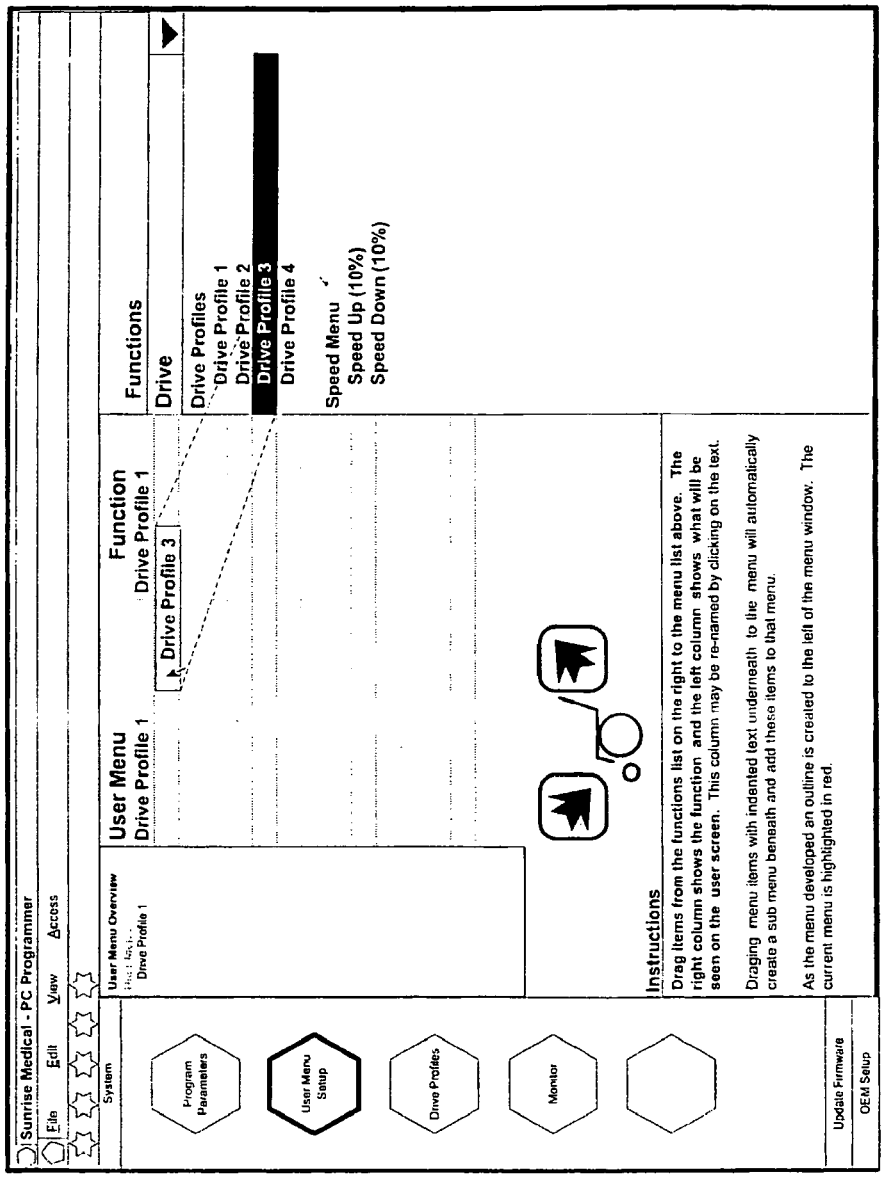
Figure 22:
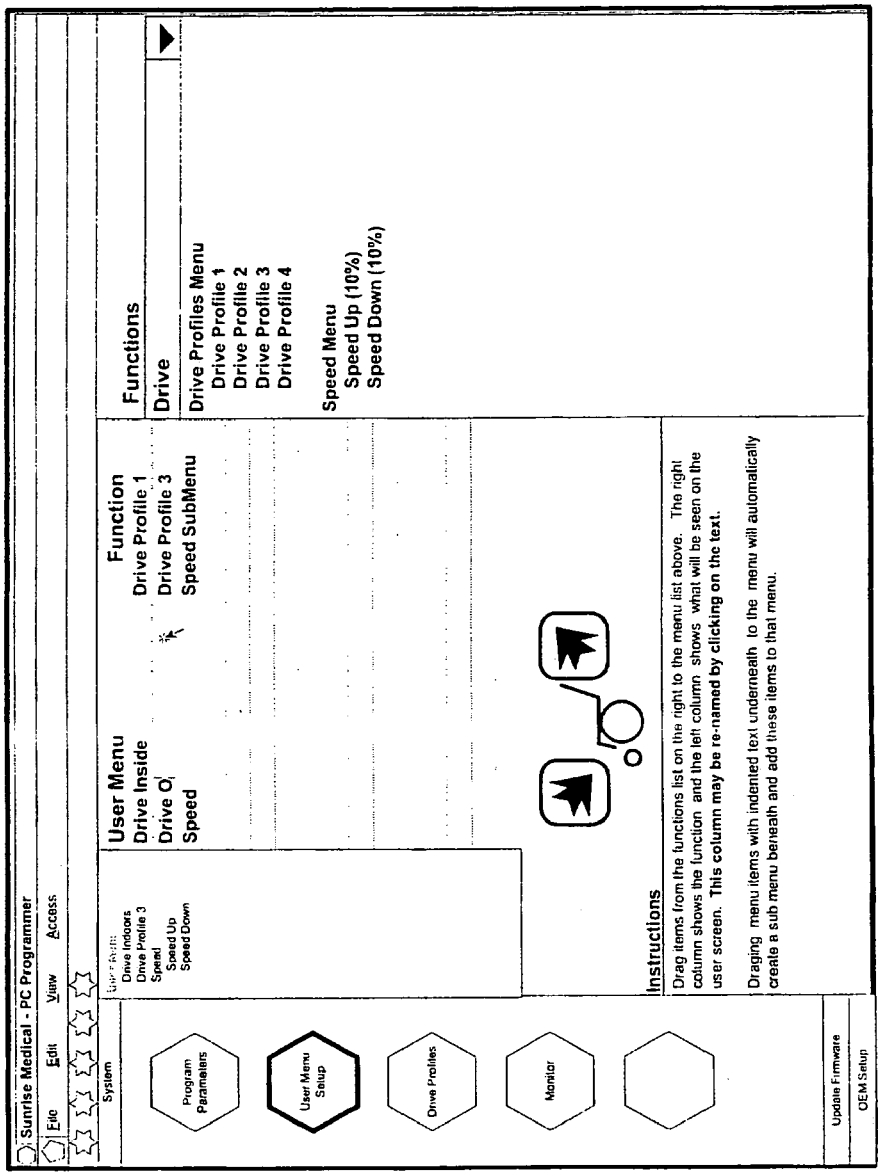
Figure 23:
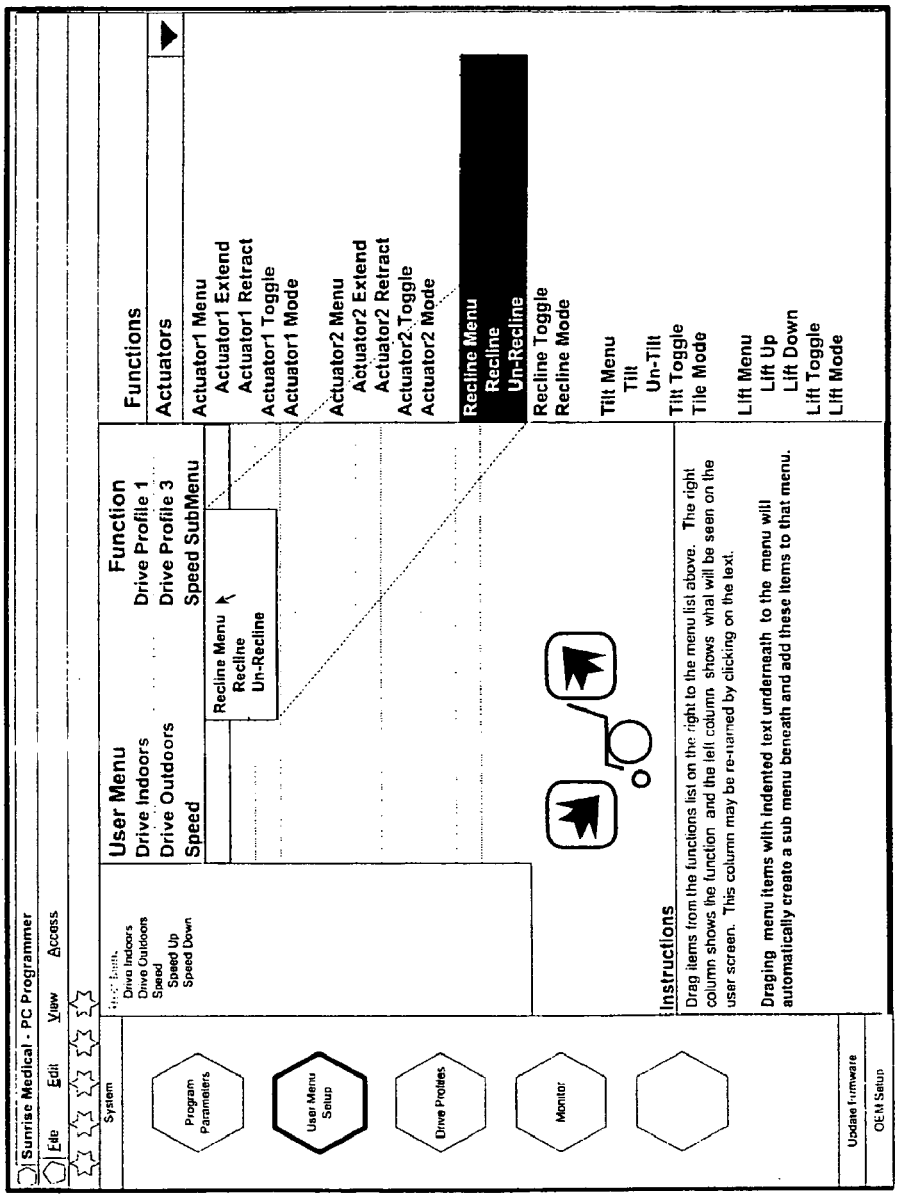
Figure 24:
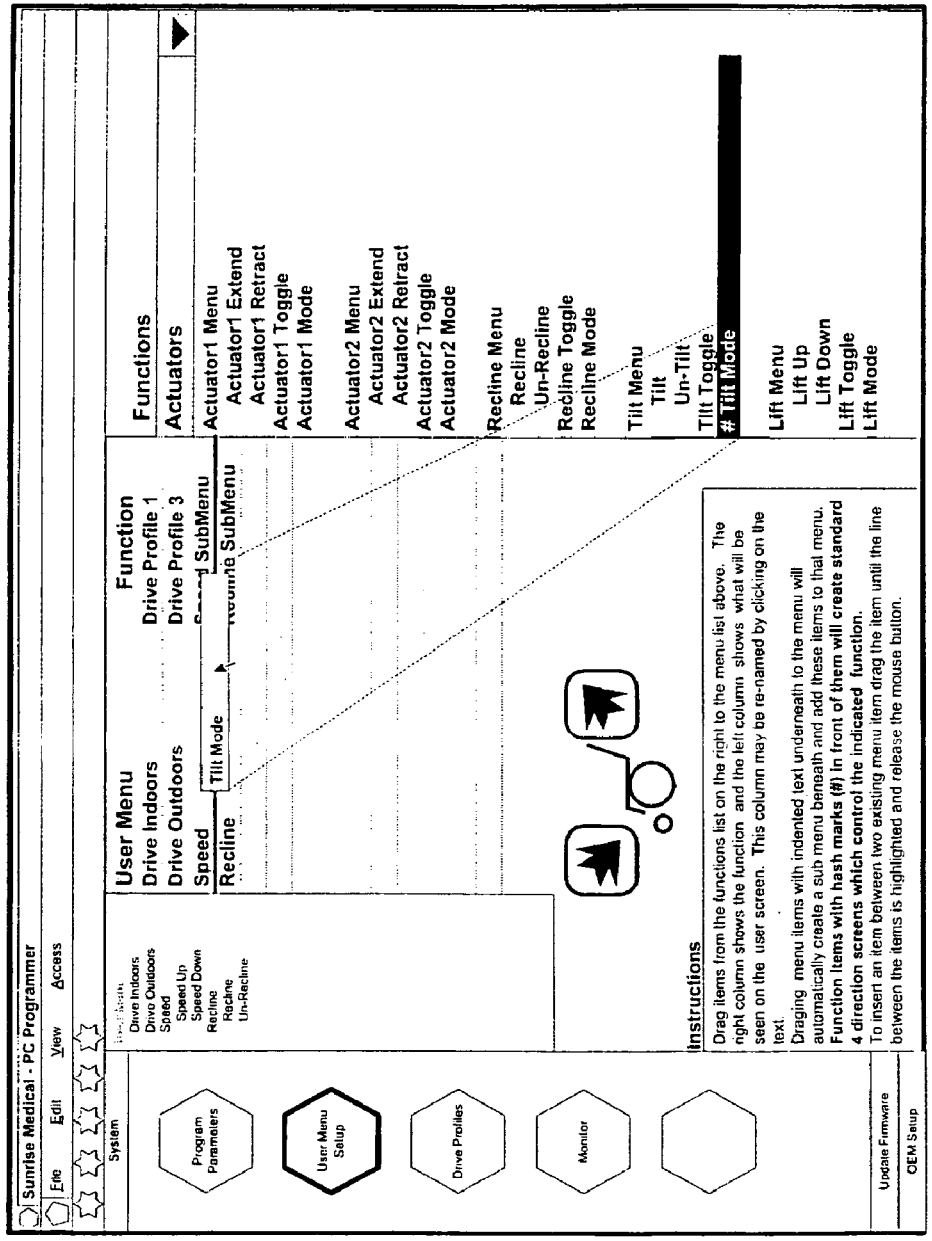
Figure 25:
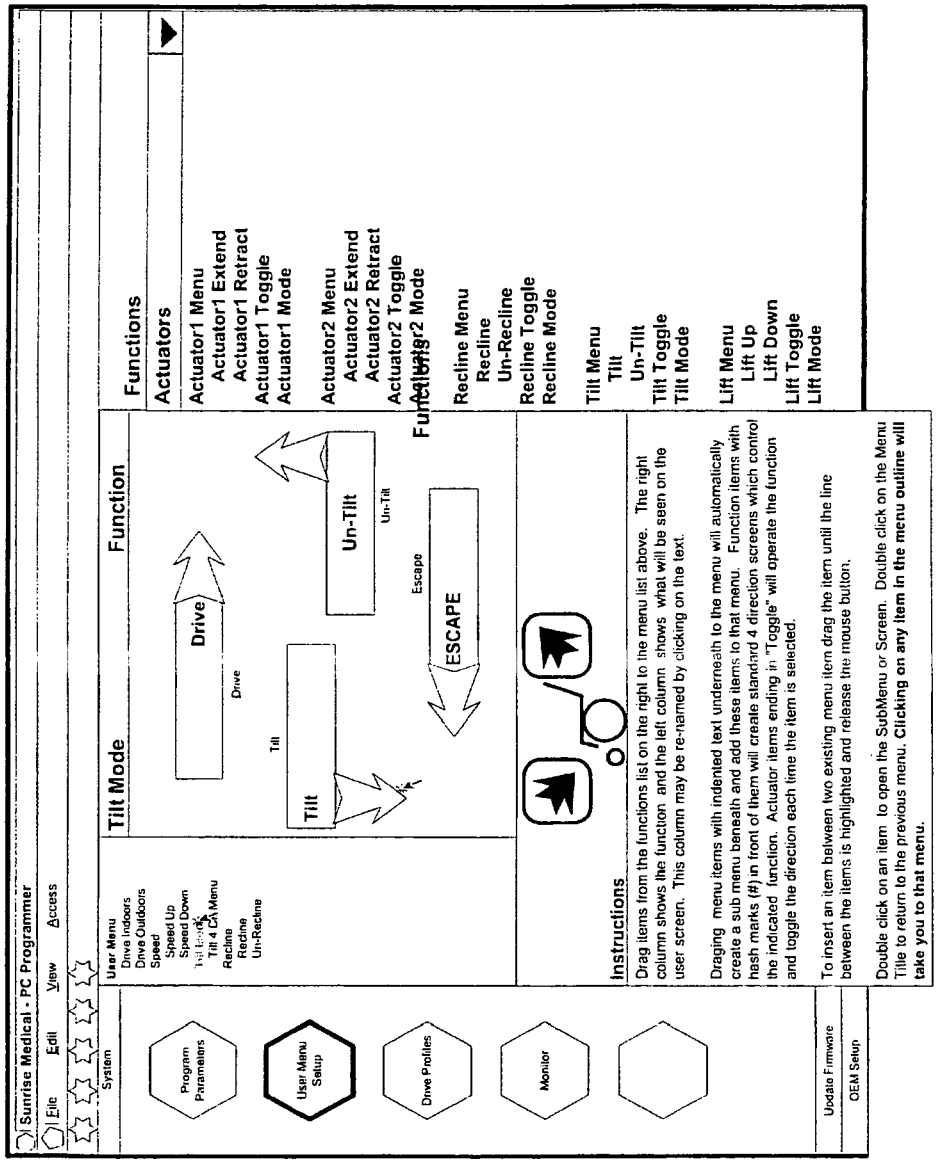
Figure 26:
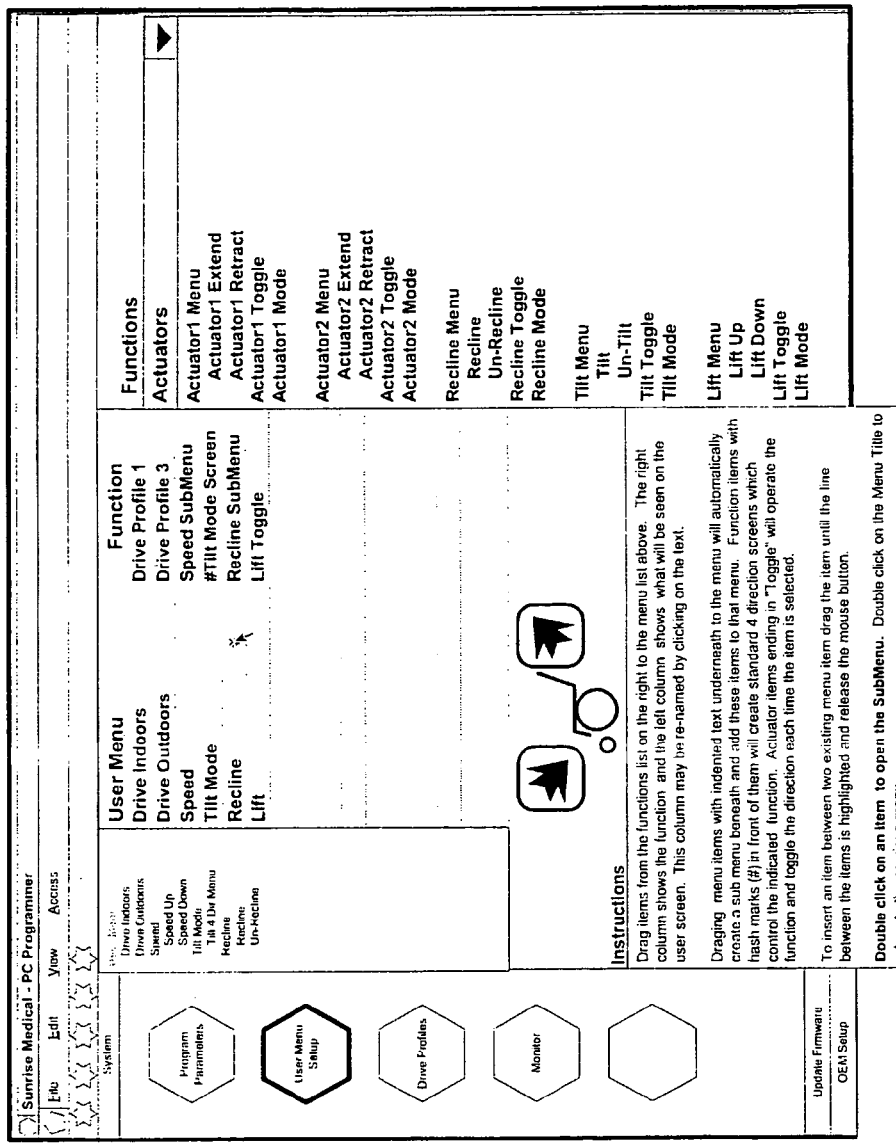
Figure 27:
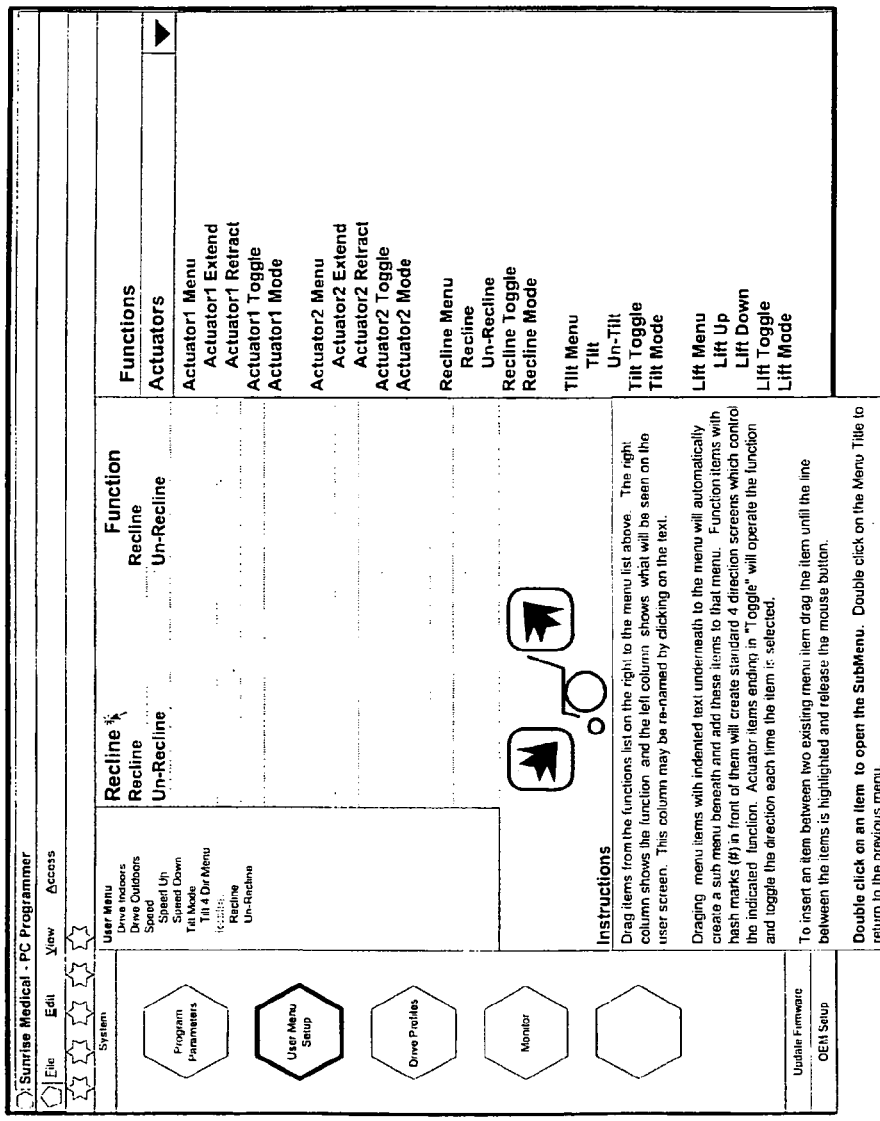
Figure 28:
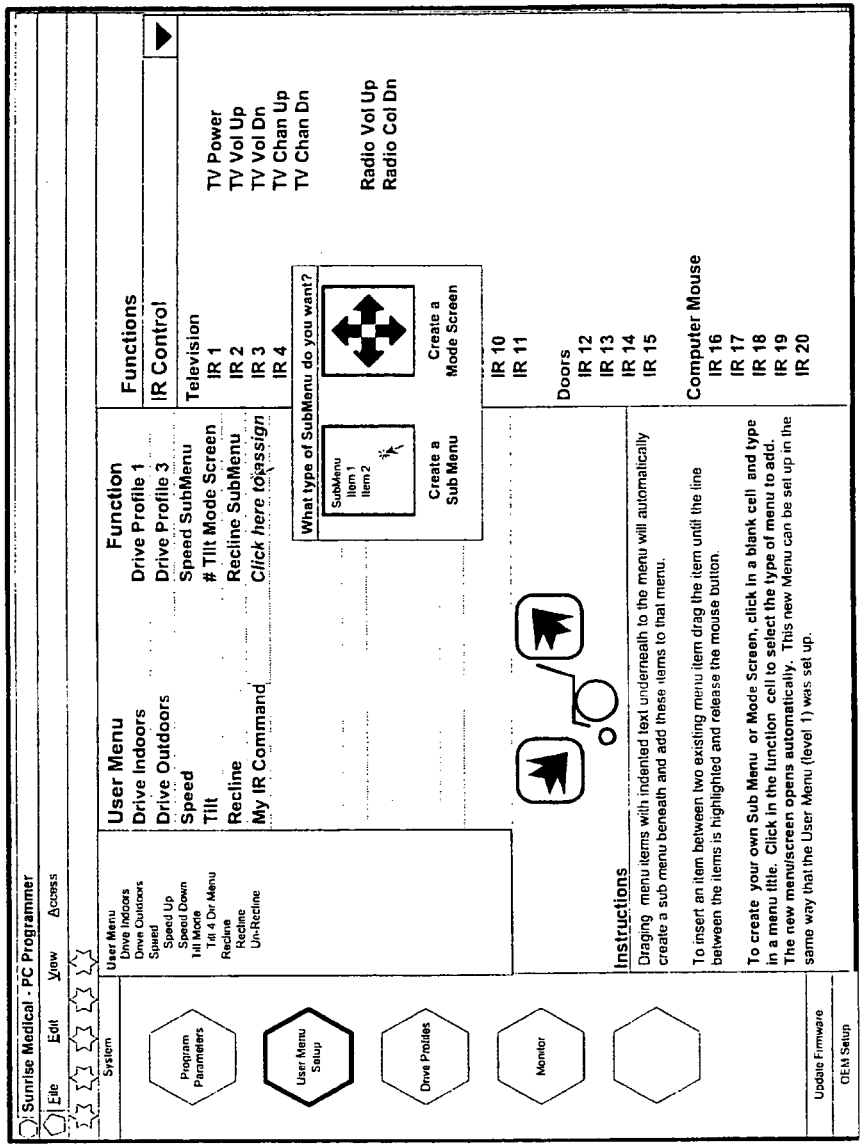
Figure 29:
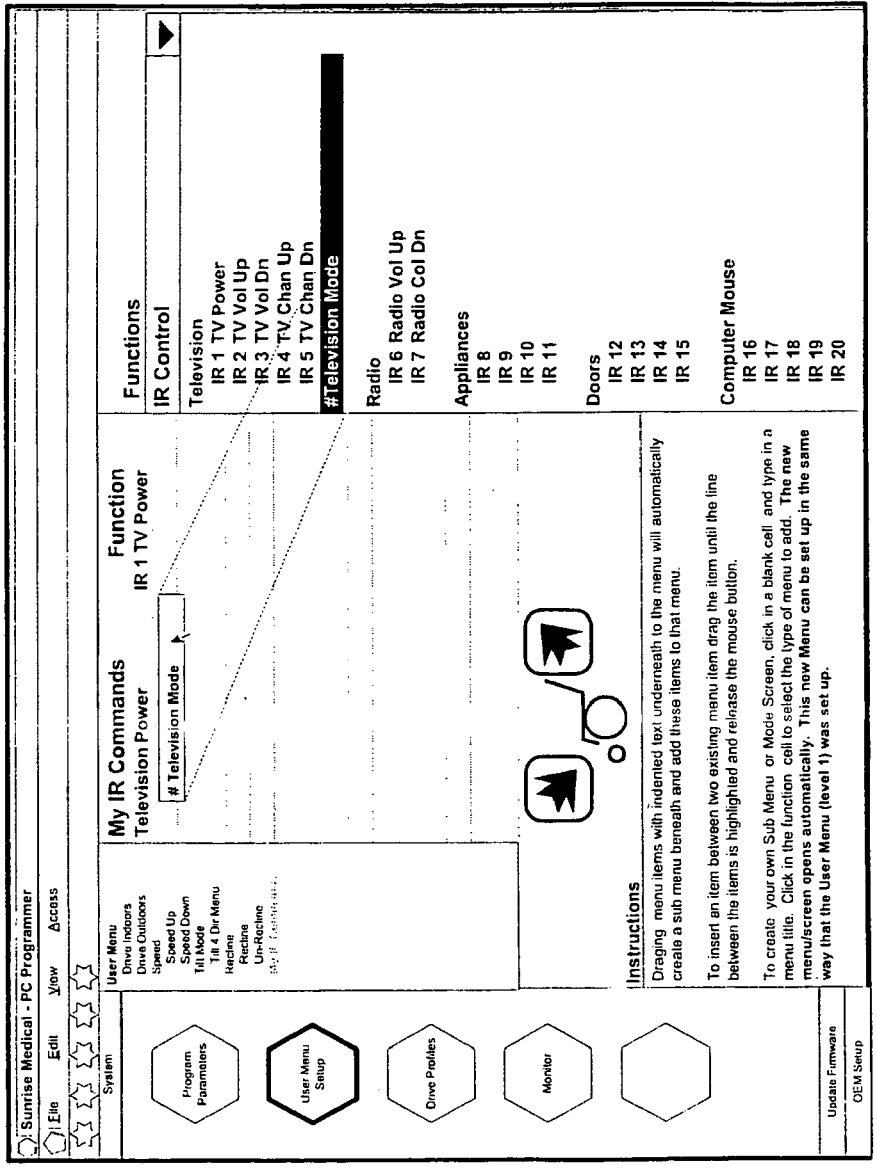

FIGS. 20-29 are examples of user interface for structuring the User Menu. Instructions may be provided, such as those at the bottom center of the interface, to aid in structuring the User Menu. The instructions appearing in bold font throughout the drawings pertain to the interface function being performed. For example, FIG. 20 shows the function "Drive" being selected from a list of functions. FIG. 21 shows items, (i.e., "Drive Profile 1" and "Drive Profile 3" in the drawing) being selected from the list (i.e., on the right in FIG. 21) being moved or added to the User Menu by dragging and dropping items into the user menu (i.e., in the center when viewing FIG. 21). The User Menu may be separated into two columns, such as the left and right columns shown. The left column may show what will appear in the User Menu and the right column may show what function is to be performed. The items in the left column may be renamed by clicking on the text in the left column. As shown in FIG. 22. "Drive Profile 1" has been renamed "Drive Inside" and "Drive Profile 3" is being renamed "Drive Outside". Dragging a menu item (i.e., "Recline Menu" when viewing in FIG. 23) with sub-menus (i.e., "Recline" and "Un-Recline" when viewing FIG. 23) into the User Menu may automatically create a sub-menu in the User Menu in connection with the item being added. Items that create display or mode screens, such as direction screens, may be tagged with a corresponding symbol. For example, the item labeled "Tilt Mode" in FIG. 24 is tagged with a hash mark (#). Clicking on an item may open that item. For example, by clicking on Tilt Mode, the four-direction screen (shown in FIG. 25) opens. This screen controls the functions in Tilt Mode. A sub-menu (i.e., the "Recline SubMenu" in FIG. 26) may be opened by clicking on an item (i.e., "Recline"). As shown in FIG. 27, the Recline sub-menu may have two items, including, for example, "Recline" and Un-Recline". A sub-menu, or mode screen, may be created by clicking on a blank cell in the User Menu and typing a menu title. A corresponding menu may be selected by clicking on a function cell, as shown in FIG. 28, which may automatically open a menu/screen. Environmental control menu selection items may be selected from a list, as shown in FIG. 29, in a manner similar to vehicle menu selection items, as described above.

It should be appreciated that the control system may include an on-board menu editor that permits the user to structure and restructure the menu structure. For example, the user could navigate through a menu tree, scrolling or drilling down into the menu structure to a menu selection item, for example, using one input, such as the joystick of the hand control module 126 described above. Once the user reaches the menu selection item, the user may simply use another input, such as one of the programmable buttons (i.e., buttons labeled "A" and "B"), or a button (e.g., a "Favorites" button) in place thereof, to move or copy the menu selection item to a higher level in the menu structure, such as to the main or user menu.

As yet another alternative, the control system may be configured to track menu selection items most frequently used by the user and move or copy the most frequently used menu selection items into a higher level of the menu based on frequency of use. For example, most frequently used menu selection items could be moved or copied to a main menu (e.g., the main menu or the user menu). Additionally, if desired, the control system could be configured to permit less frequently used menu selection items to be moved or copied to a sub-menu level and the least frequently used menu selection items to be moved or copied to the lowest level of the menu.

The principle and mode of operation of this invention have been explained and illustrated as an exemplary embodiment. However, it must be understood that this invention may be practiced otherwise than as specifically explained and illustrated without departing from its spirit or scope.

What is claimed is:

1. A wheelchair comprising:
  a chassis;
  a seat system for supporting a user:
  one or more wheels supporting the chassis for movement in relation to a supporting surface;
  a battery supported in relation to the chassis;
  a wiring assembly supplying power to at least one electronic component of the wheelchair;
  control system for controlling the electronic component of the wheelchair, the control system comprising a menu structure programmed in machine code, the menu structure including a menu tree having at least one main menu and at least one sub-menu, the sub-menu having at least one menu selection item, the control system being configured so that the menu selection item can be copied or moved to the main menu without altering the machine code so that the menu selection item can be selected without navigating to the sub-menu.

2. The wheelchair of claim 1, wherein the menu selection item is selectively in the form of text, an icon or a combination thereof.

3. The wheelchair of claim 2, wherein the control system is structured so that the text can be changed or replaced with new text.

4. The wheelchair of claim 1, further comprising a connector for attaching an external device to the control system, the external device being structured to configure the menu structure.

5. The wheelchair of claim 1, wherein the at least one menu selection item includes more than one menu selection item, the control system further comprising an auto-scan feature that automatically scrolls through the menu structure pausing at each menu selection item to allow the user to select that item.

6. A power wheelchair comprising:
a chassis;
a seat system for supporting a user in relation to the chassis;
one or more wheels supporting the chassis for movement in relation to a supporting surface; and
an electronic display displaying a menu structure having a main menu and a dynamic user menu, the main menu having one or more menu selection items for controlling a component or function of the wheelchair, the menu structure being configured so that at least one of the one or more menu selections items can be copied or moved to the dynamic user menu.

7. The power wheelchair of claim 6, wherein the one or more menu selection items are selectively in the form of text, an icon or a combination thereof.

8. The power wheelchair of claim 7, wherein the control system is structured so that the text can be changed or replaced with new text.

9. The power wheelchair of claim 6, further comprising a connector for attaching an external device to the control system, the external device being structured to configure the menu structure.

10. The power wheelchair of claim 6, wherein the one or more menu selection items includes more than one menu selection item, the display further comprising an auto-scan feature that automatically scrolls through the menu structure pausing at each menu selection item to allow the user to select that item.

11. A wheelchair comprising:
a chassis;
a seat system for supporting a user in relation to the chassis;
one or more wheels supporting the chassis for movement in relation to a supporting surface;
an electronic control system for controlling a component or function of the wheelchair; and
a display interfacing a user with the electronic control system, the display having a menu structure having a menu selection item located therein, the menu selection item being selectable to effect control of the component or function by the electronic control system, the menu structure being configured so that the manner in which the menu selection item is accessed by a user can be readily changed.

12. The wheelchair of claim 11, wherein the component is one of a motor, an actuator or an environmental control module.

13. The wheelchair of claim 11, wherein the menu selection item is selectively in the form of text, an icon or a combination thereof.

14. The wheelchair of claim 11, wherein a personal computer is connected to the control system, the personal computer having menu editing software configured to change the manner in which the menu selection item is accessed by a user.

15. The wheelchair of claim 11, wherein a handheld device is connected to the control system, the handheld device having menu editing software configured to change the manner in which the menu selection item is accessed by a user.

16. The wheelchair of claim 11, wherein the menu selection item is one of a plurality of menu selection items, the control system further comprising an auto-scan feature that automatically scrolls through the menu structure pausing at each menu selection item to allow the user to select that item.

17. A power wheelchair comprising;
a chassis;
a seat system for supporting a user in relation to the chassis;
one or more wheels supporting the chassis for movement in relation to a supporting surface; and
an electronic display displaying a menu structure having a fixed menu and a dynamic user menu, the fixed menu having one or more static menu selection items for controlling a component or function of the wheelchair, the dynamic user menu comprising one or more shortcuts that control the component or function without navigating to and selecting the static menu selection item in the main menu.

18. The wheelchair of claim 17, further comprising a programmer connected to the wheelchair for adding shortcuts to or removing shortcuts from the dynamic user menu.

19. The wheelchair of claim 17, wherein the one or more static menu selection items is more than one static menu selection item, and wherein the one or more shortcuts is more than one shortcut the control system further comprising an auto-scan feature that automatically scrolls through the menu structure pausing at each menu selection item or shortcut to allow the user to select that item or shortcut.

20. A wheelchair comprising:
a chassis supported for movement relative to a supporting surface;
a seat supported in relation to the chassis for supporting a user;
at least one module supported in relation to the chassis for performing a function;
an input device supported in relation to the seat for controlling the module; and
a control system including a display having a menu with one or more menu selection items, the controller being responsive to the input device for selectively operating the module, the controller being structured so that the arrangement of menu selection items can be selectively changed.

21. A power wheelchair comprising:
a seat;
at least one output device;
at least one drive wheel supporting the seat and output device in relation to a supporting surface; and
a control system that controls the output device, the control system comprising:
an input device; and
a display upon which a menu structure is viewed, the menu structure having an arrangement of menu selection items, at least one of which controls the output device responsive to input from the input device, the control system being configured so that the arrangement of menu selection items in the menu structure can be selectively changed.

22. A wheelchair comprising:

a chassis;

wheels supporting the chassis for movement in relation to a supporting surface;

a seat supported in relation to the chassis;

at least one module supported in relation to the chassis for performing a function;

an input supported in relation to the seat for controlling the module;

a control system including a display having a menu with one or more menu selection items, the control system being responsive to the input for selectively operating the module; and a dongle connected to a port of the control system;

a program module connected to the control system through the dongle, the program module having a software application that performs menu editing for changing the arrangement of the menu selection items.

23. A wheelchair comprising:

a chassis;

wheels supporting the chassis for movement in relation to a supporting surface;

a seat supported in relation to the chassis;

at least one module supported in relation to the chassis for performing a function;

a control system including a display having a menu structure including a top menu and one or more sub-menus with one or more menu selection items, the control system being responsive to the selection of a menu selection item by a first input for operating the module, the control system being responsive to a second input for moving or copying a favorite menu selection item from the sub-menu to the top menu.

24. The wheelchair to claim 23, wherein the second input is a favorites button on a user interface.

25. A wheelchair comprising:

a chassis;

wheels supporting the chassis for movement in relation to a supporting surface;

a seat supported in relation to the chassis;

a control system for controlling modules or functions of the wheelchair, the control system having a menu structure and being configured to allow the menu to be modified by scrolling a list and making a selection, dragging and dropping a selection into a field, typing a selection into a field, navigating from one level of the menu structure to another to make a selection, or setting a value for a parameter.

26. A wheelchair comprising:

a chassis;

wheels supporting the chassis for movement in relation to a supporting surface;

a seat supported in relation to the chassis;

a control system for controlling modules or functions of the wheelchair, the control system having a menu structure with menu selection items and being configured to track menu selection items most frequently used by the user and move or copy the most frequently used menu selection items into a higher level of the menu structure.

27. The wheelchair of claim 26, wherein the control system is further configured to copy or move the most frequently used menu selection hems to a main menu.

28. The wheelchair of claim 26, wherein the control system is further configured to copy or move the most frequently used menu selection items to a dynamic user menu.

29. The wheelchair of claim 26, wherein the control system is further configured to copy or move less frequently used menu selection items to a sub-menu level and to copy or move the least frequently used menu selection items to a lowest level of the menu.

* * * * *

UNITED STATES PATENT AND TRADEMARK OFFICE
CERTIFICATE OF CORRECTION

| | | |
|---|---|---|
| PATENT NO. | : 7,310,776 B2 | Page 1 of 1 |
| APPLICATION NO. | : 11/648917 | |
| DATED | : December 18, 2007 | |
| INVENTOR(S) | : Wayne T. Mansell et al. | |

It is certified that error appears in the above-identified patent and that said Letters Patent is hereby corrected as shown below:

In the claims:

Column 18, Claim 19, Line 32, insert a --,-- after "shortcut", and

Column 20, Claim 27, Line 28, delete "hems" and insert --items--.

Signed and Sealed this

Twenty-ninth Day of April, 2008

JON W. DUDAS
*Director of the United States Patent and Trademark Office*